US009544488B2

(12) United States Patent
Dawson et al.

(10) Patent No.: US 9,544,488 B2
(45) Date of Patent: Jan. 10, 2017

(54) STAR TRACKER WITH STEERABLE FIELD-OF-VIEW BAFFLE COUPLED TO WIDE FIELD-OF-VIEW CAMERA

(71) Applicant: The Charles Stark Draper Laboratory, Inc., Cambridge, MA (US)

(72) Inventors: Robin Mark Adrian Dawson, Watertown, MA (US); Juha Pekka Laine, Boston, MA (US); Murali Chaparala, Newton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 636 days.

(21) Appl. No.: 13/893,987

(22) Filed: May 14, 2013

(65) Prior Publication Data

US 2014/0340522 A1 Nov. 20, 2014

(51) Int. Cl.
*G01C 21/02* (2006.01)
*H04N 5/225* (2006.01)
*B64G 1/36* (2006.01)

(52) U.S. Cl.
CPC ............ *H04N 5/2259* (2013.01); *B64G 1/361* (2013.01)

(58) Field of Classification Search
CPC ...................................................... B64G 1/361
USPC ........................................ 701/513, 13, 408
See application file for complete search history.

(56) References Cited

U.S. PATENT DOCUMENTS

| | | | |
|---|---|---|---|
| 3,166,623 A | 1/1965 | Waidelich | 88/1 |
| 3,359,682 A | 12/1967 | Clark | 49/40 |
| 4,331,390 A | 5/1982 | Shafer | 350/444 |
| 5,745,869 A | 4/1998 | van Bezooijen | 701/222 |
| 6,215,593 B1 | 4/2001 | Bruce | 359/619 |
| 2011/0211106 A1 | 9/2011 | Marks et al. | 348/340 |
| 2013/0110440 A1 | 5/2013 | Burkland | 702/104 |
| 2014/0267641 A1 | 9/2014 | Laine et al. | 348/61 |
| 2014/0267755 A1 | 9/2014 | Laine et al. | 348/162 |
| 2015/0124103 A1 | 5/2015 | Dawson et al. | H04N 5/2259 |

FOREIGN PATENT DOCUMENTS

| | | | | |
|---|---|---|---|---|
| JP | 10020212 A | * | 7/1996 | |
| JP | 2000-120288 | | 4/2000 | E04H 3/10 |
| JP | U3084435 | | 12/2001 | E04B 7/16 |

(Continued)

OTHER PUBLICATIONS

White et al., "Satellite Autonomous Navigation with SHAD", The Charles Stark Draper Laboratory, Inc., 119 pages, Apr. 1987.

(Continued)

*Primary Examiner* — Brian Yenke
*Assistant Examiner* — Omer Khalid
(74) *Attorney, Agent, or Firm* — Sunstein Kann Murphy & Timbers LLP

(57) ABSTRACT

A star tracker has an electronically steerable point of view, without requiring a precision aiming mechanism. The star tracker can be strapped down, thereby avoiding problems associated with precision aiming of mechanical devices. The star tracker images selectable narrow portions of a scene, such as the sky. Each stellar sighting can image a different portion of the sky, depending on which navigational star or group of navigational stars is of interest. The selectability of the portion of the sky imaged enables the star tracker to avoid unwanted light, such as from the sun.

71 Claims, 20 Drawing Sheets

(56) References Cited

FOREIGN PATENT DOCUMENTS

| JP | 2005-325596 | 11/2005 | ............... E04H 3/10 |
|---|---|---|---|
| WO | WO 2006/113938 | 10/2006 | ............. G02B 23/16 |

OTHER PUBLICATIONS

Samaan et al., "Predictive Centroiding for Single and Multiple FOVs Star Trackers", Texas A&M University, 13 pages, 2002.

Willhite, "An Analysis of ICBM Navigation Using Optical Observations of Existing Space Objects", MIT Libraries, 123 pages, Jun. 2004.

Shectman, GMACS, The GMT Wide-Field Optical Spectrograph, 34 pages, Jul. 8, 2006.

Hahn et al., "Fiber optic bundle array wide field-of-view optical receiver for free space optical communications", Optics Letters, vol. 35, No. 21, pp. 3559-3561, Nov. 1, 2010.

Son et al., "A Multiscale, Wide Field, Gigapixel Camera", Imaging and Applied Optics Technical Digest, 3 pages, 2011.

Cheng et al., "Wide field-of-view imaging spectrometer using imaging fiber bundles", Applied Optics, vol. 50, No. 35, pp. 6446-6451, Dec. 10, 2011.

Marks et al., "Engineering a gigapixel monocentric multiscale camera", Optical Engineering, vol. 5, No. 8, pp. 1-14, Aug. 2012.

Stamenov et al., "Optimization of two-glass monocentric lenses for compact panoramic imagers: general aberration analysis and specific designs", Applied Optics, vol. 51, No. 31, pp. 7648-7661, Nov. 1, 2012.

AWARE2 Multiscale Gigapixel Camera, http://disp.duke.edu/projects/AWARE/?print, 5 pages, Jun. 29, 2012.

Stellar Horizon Atmospheric Dispersion Experiment, NASA-NSSDC-Experiment, Details, http://nssdc.gsfc.nasa.gov/nmc/experimentDisplay.do?id=AFP-888%20%20-04, 1 page, Mar. 28, 2013.

SHAD (Stellar Horizon Atmospheric Dispersion), ITE Inc. SHAD Overview, http://www.iteinc.net/instrument/shad.html, 1 page, Mar. 28, 2013.

Healthcare: Fiber Bundles, Schott North America, Inc., http://www.us.schott.com/lightingimaging/english/products/healthcare/medicalillumination/ . . . , I page, Apr. 9, 2013.

Smart Glass, Wikipedia, http://en.wikipedia.org/w/index.php?title=Smart_glass&oldid=553916596, 8 pages, May 7, 2013.

International Searching Authority, International Search Report—International Application No. PCT/US2014/033985, dated Aug. 26, 2014, together with the Written Opinion of the International Searching Authority, 24 pages.

* cited by examiner

Section A-A

STAR TRACKER WITH STEERABLE FIELD-OF-VIEW BAFFLE COUPLED TO WIDE FIELD-OF-VIEW CAMERA

TECHNICAL FIELD

The present invention relates to star trackers and, more particularly, to strap-down, wide field-of-view (FOV) start trackers that include steerable field-of-view baffles.

BACKGROUND ART

Most artificial satellites, spacecraft and other propelled devices such as aircraft, ship and ground vehicles (collectively referred to herein as vehicles) require information about their locations and/or attitudes to accomplish their missions. This information may be obtained from one or more sources, such as the global positioning system (GPS), ground-based radar tracking stations and/or an on-board star tracker.

A star tracker is an optical device that measures bearing(s) to one or more stars, as viewed from a vehicle. A star tracker typically includes a star catalog that lists bright navigational stars and information about their locations in the sky, sufficient to calculate a location of a vehicle in space, given bearings to several of the stars. A conventional star tracker includes a lens that projects an image of a star onto a photocell, or that projects an image of one or more stars onto a light-sensitive sensor array (digital camera).

One type of star tracker is "strapped-down," meaning its view angle, relative to its vehicle, is fixed. Another type of star tracker can be aimed mechanically, such as in a direction in which a navigational star is expected to be seen. Using data from the photocell or sensor array, the star catalog and information about the star tracker's view angle, relative to the vehicle, the star tracker calculates a position of the vehicle in space.

Strapped-down star trackers are mechanically simpler than mechanically aimable star trackers. However, the fixed view angle of a strapped-down star tracker limits the number of navigational stars that may be used. Mechanically aimable start trackers can use a larger number of navigational stars. However, aiming a prior art star tracker, relative to its vehicle, with the required precision poses substantial problems. In either case, preventing stray light, such as from the sun or reflected from the moon, reaching the photocell or sensor array is challenging, particularly when a navigational star of interest is apparently close to one of these very bright objects.

SUMMARY OF EMBODIMENTS

An embodiment of the present invention provides a star tracker. The star tracker includes a camera and an electronically adjustable baffle assembly. The camera has a field of view. The electronically adjustable baffle assembly is disposed relative to the camera. The electronically adjustable baffle assembly is configured to expose a selectable portion, less than all, of the camera field of view to a scene.

The selectable portion of the camera field of view may be circular. The camera field of view may be greater than about 10°. The selectable portion of the camera field of view may include less than about 30% of the camera field of view.

The baffle assembly may include at least a portion of a dome. The dome may define an aperture. The aperture may be configured to define the selectable portion of the camera field of view exposed to the scene. The baffle assembly may be rotatable about an optical axis of the camera.

The baffle assembly may include at least a portion of a dome. The dome may define an aperture. The aperture may be configured to expose the selectable portion of the camera field of view to the scene. The baffle assembly may be rotatable about an optical axis of the camera.

The aperture may be positionable along an arc that intersects, and is coplanar with, the optical axis of the camera.

The aperture may be positionable within the camera field of view.

The baffle assembly may include a baffle having an axis that coincides with an optical axis of the selectable portion of the camera field of view.

The selectable portion of the field of view of the camera may include at least two discontiguous regions of the field of view of the camera.

The baffle assembly may include a plurality of elements. Transparency of each element of the plurality of elements may be electronically controllable. The selectable portion of the field of view of the camera may be exposed to the scene through at least one transparent element of the plurality of elements. Remaining portion of the field of view of the camera may be obscured from the scene by at least one non-transparent element of the plurality of the elements.

Size of the selectable portion of the field of view of the camera may be electronically adjustable.

The camera may include a monocentric objective lens.

The camera may include a plurality of pixelated image sensor arrays and a plurality of optical fibers. The plurality of optical fibers may optically couple each pixelated image sensor array of the plurality of pixelated image sensor arrays to the monocentric objective lens.

The star tracker may also include a first rate sensor, a second rate sensor and a controller. The first rate sensor may have a first sensory axis. The first rate sensor may be mechanically coupled to the camera. The second rate sensor may have a second sensory axis perpendicular to the first sensory axis. The second rate sensor may be mechanically coupled to the camera. The controller may be coupled to the camera, the baffle, the first rate sensor and the second rate sensor. The controller may be configured to measure vibration of the camera, based on input signals from the first rate sensor and the second rate sensor. The controller may be further configured to process an image captured by the camera, based on the vibration.

The star tracker may also include a controller coupled to the camera and the baffle assembly. The controller may be configured to cause the camera to capture a first image. The controller may be configured to then adjust the baffle assembly, such that a different portion of the camera field of view is exposed to the scene. The controller may be configured to then cause the camera to capture a second image.

The controller may be configured to determine a location of the camera, based at least in part on an analysis of at least a portion of the first image and at least a portion of the second image.

The star tracker may also include a controller coupled to the camera and the baffle assembly. The controller may be configured to adjust the baffle assembly, such that the selectable portion of the camera field of view includes a portion of the scene expected to include a space object having a predictable location. The controller may be further configured to cause the camera to capture an image and determine a location of the camera, based at least in part on information about the space object and an analysis of at least a portion of the image.

The space object may be or include an astronomical object and/or an artificial satellite.

The controller may be configured to determine the location of the camera based at least in part on dispersion and/or refraction of light from the space object through earth's atmospheric limb.

The star tracker may include a controller coupled to the camera and the baffle assembly. The controller may be configured to cause the camera to capture an image and analyze a portion, less than all, of the image. The portion of the image may correspond to the portion of the camera field of view exposed to the scene.

The camera may include a plurality of image sensor arrays. Each image sensor array of the plurality of image sensor arrays may include a plurality of pixels. The star tracker may also include a controller coupled to the camera and the baffle assembly. The controller may be configured to read a subset, less than all, of the pixels of the plurality of image sensor arrays. The subset may correspond to the selectable portion of the camera field of view exposed to the scene.

Another embodiment of the present invention provides a method for exposing a selectable portion, less than all, of a field of view of a camera to a scene. The method includes disposing a baffle assembly adjacent the camera. The camera is aimed toward an interior of the baffle assembly. The baffle assembly is configured to define an aperture whose position on the baffle assembly is electronically adjustable. The aperture defines the selectable portion, less than all, of the field of view of the camera exposed to the scene. Under control of a processor, the position of the aperture on the baffle assembly is adjusted, such that the aperture is oriented toward the scene.

The baffle assembly may include a dome that defines an elongated opening extending along a longitude of the dome. The method may include disposing a curtain within the opening. The curtain may be movable along the longitude of the dome. The curtain may obscure the opening from the camera field of view, except the portion of the curtain defining the aperture. Adjusting the position of the aperture may include, under control of a processor, rotating the dome about an axis of symmetry of the dome, such that the opening in the dome is oriented toward the scene. Adjusting the position of the aperture may also include, under control of a processor, moving the curtain along the longitude of the dome, such that the aperture is oriented toward the scene.

The baffle assembly may include a dome that includes a plurality of elements. Transparency of each element of the plurality of elements may be electronically controllable. Adjusting the position of the aperture on the baffle assembly may include, under control of a processor, setting transparency of at least one selected element of the plurality of elements, such that the selectable portion of the field of view of the camera is exposed to the scene through at least one transparent element of the plurality of elements. A remaining portion of the field of view of the camera may be obscured from the scene by at least one non-transparent element of the plurality of the elements.

Adjusting the position of the aperture on the baffle assembly may include, under control of the processor, setting transparency of the at least one selected element of the plurality of elements to adjust size of the aperture.

Optionally, under control of a processor, vibration of the camera may be measured, based on input signals from a first rate sensor and a second rate sensor. An image captured by the camera may be processed, based on the vibration.

After adjusting the position of the aperture, under control of a processor, a first image may be captured by the camera. Then, the position of the aperture on the baffle assembly may be adjusted, such that a different portion of the camera field of view is exposed to the scene. Then, under control of the processor, a second image may be captured by the camera.

Optionally, a location of the camera may be determined, based at least in part on an analysis of at least a portion of the first image and at least a portion of the second image.

Adjusting the position of the aperture may include automatically adjusting the position of the aperture such that the selectable portion of the camera field of view includes a portion of the scene expected to include a space object having a predictable location. The camera may be caused to capture an image. A location of the camera may be automatically determined, based at least in part on information about the space object and an analysis of at least a portion of the image.

The space object may be or include an astronomical object and/or an artificial satellite.

Determining the location of the camera may include determining the location of the camera based at least in part on dispersion and/or refraction of light from the space object through earth's atmospheric limb.

The camera may be automatically caused to capture an image. A portion, less than all, of the image may be automatically analyzed. The portion of the image that is analyzed corresponds to the portion of the camera field of view exposed to the scene.

The camera may include a plurality of image sensor arrays. Each image sensor array of the plurality of image sensor arrays may include a plurality of pixels. The method may further include reading a subset, less than all, of the pixels of the plurality of image sensor arrays. The subset may correspond to the selectable portion of the camera field of view exposed to the scene.

Yet another embodiment of the present invention provides a computer program product for exposing a selectable portion, less than all, of a field of view of a camera to a scene. A baffle assembly is disposed adjacent the camera. The camera is aimed toward an interior of the baffle assembly. The baffle assembly is configured to define an aperture whose position on the baffle assembly is electronically adjustable. The aperture defines the selectable portion, less than all, of the field of view of the camera exposed to the scene. The computer program product includes a non-transitory computer-readable medium. Computer readable program code is stored on the medium. The computer readable program code is configured to cause the processor to perform an operation, including adjusting the position of the aperture on the baffle assembly, such that the aperture is oriented toward the scene.

The baffle assembly may include a dome. The dome may define an elongated opening extending along a longitude of the dome. A curtain may be disposed within the opening. The curtain may be movable along the longitude of the dome. The curtain may obscure the opening from the camera field of view, except where the curtain defines the aperture. The computer readable program code may be configured to adjust the position of the aperture by causing the processor to perform operations including rotating the dome about an axis of symmetry of the dome, such that the opening in the dome is oriented toward the scene. In addition, the curtain may be moved along the longitude of the dome, such that the aperture is oriented toward the scene.

The baffle assembly may include a dome. The dome may include a plurality of elements. Transparency of each element of the plurality of elements may be electronically controllable. The computer readable program code may be configured to adjust the position of the aperture by causing the processor to perform an operation including setting transparency of at least one selected element of the plurality of elements, such that the selectable portion of the field of view of the camera is exposed to the scene through at least one transparent element of the plurality of elements. A remaining portion of the field of view of the camera may be obscured from the scene by at least one non-transparent element of the plurality of the elements.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

As used herein, the following terms have the following definitions, unless their contexts indicate otherwise.

A "limb" is an apparent visual edge of a celestial body as viewed from space.

A "atmospheric limb" is a thin layer near horizon, as viewed from space, corresponding to an atmosphere.

A "skymark" is an object in orbit with a known ephemeris that can be used for determining location based on sighting of the object; multiple sightings on skymarks are required for determination of multi-dimensional location in space.

In accordance with embodiments of the present invention, methods and apparatus are disclosed for providing and operating star trackers that have electronically steerable points of view, without requiring precision aiming mechanisms. Consequently, the star trackers can be strapped down, thereby avoiding problems associated with precision aiming of mechanical devices. Nevertheless, the star trackers can image selectable narrow portions of a scene, such as the sky. Each stellar sighting can image a different portion of the sky, depending on which navigational star or group of navigational stars is of interest. The selectability of the portion of the sky imaged enables the star trackers to avoid unwanted light, such as from the sun. Advantageously, mechanisms for selecting the portion of the scene to be imaged do not require precision aiming.

Star trackers, according to the present disclosure, may be used without resort to GPS or ground-based tracking systems. Therefore, these star trackers find utility in military and other applications, such as flight navigation, ground troop location, intercontinental ballistic missiles (ICBMs) and other weapon and transportation systems, that must function even if the GPS is compromised or not available.

Figure 1:
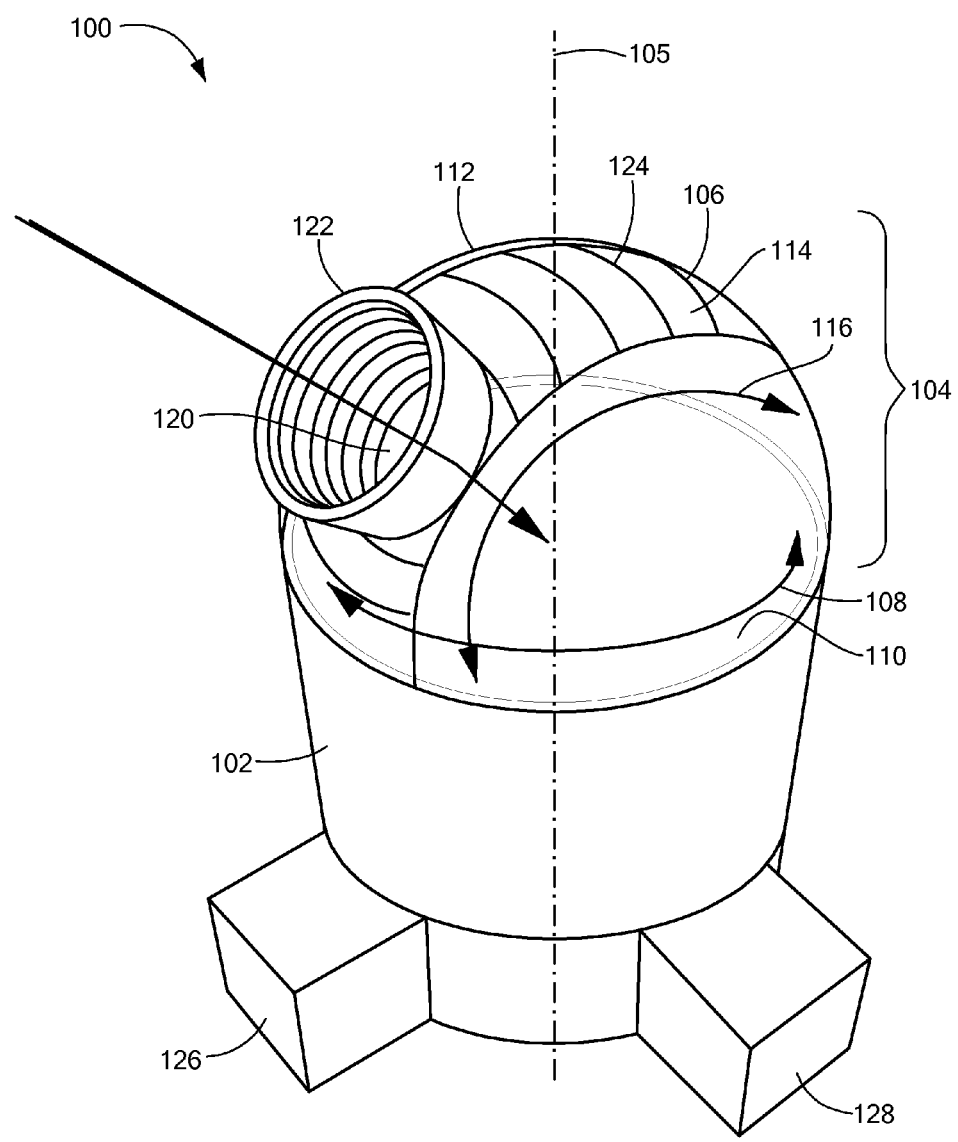
FIG. 1 is a perspective schematic view of a star tracker, according to an embodiment of the present invention.

FIG. 1 is a perspective schematic view of a star tracker 100, according to an embodiment of the present invention. The star tracker 100 includes a body 102 that houses a camera (not visible) and an adjustable baffle assembly 104 attached to the body 102. The camera, preferably a wide field-of-view camera, is aimed upward, along an axis 105 of the body 102. The baffle assembly 104 is configured to expose a selectable portion, less than all, of the camera's field of view to a scene, such as a portion of the sky.

The baffle assembly 104 includes a portion of a dome 106. The dome 106 may be hemispherical, or it may include more or less than a hemisphere. The dome 106 is rotatably coupled to the body 102, so the dome 106 can rotate as indicated by curved arrow 108, relative to the body 102. The dome 104 includes two side portions 110 and 112 that rotate together.

The dome 104 also includes a curtain 114 rotatably coupled to the two side portions 110 and 112, such that the curtain can rotate as indicated by curved arrow 116, relative to the dome 104. Thus, in this embodiment, the curtain 114 can rotate about an axis (not shown) perpendicular to the axis 105 about which the two side portions 110 and 112 rotate. The curtain 114 extends at least between the two side portions 110 and 112 to prevent light entering the interior of the baffle assembly 104, except via an aperture 120 defined by the curtain 114. The aperture 120 exposes a selectable portion, less than all, of the camera's field of view to a scene, such as the sky. The aperture 120 may be open or it may be made of a transparent material, such as glass.

Figure 2:
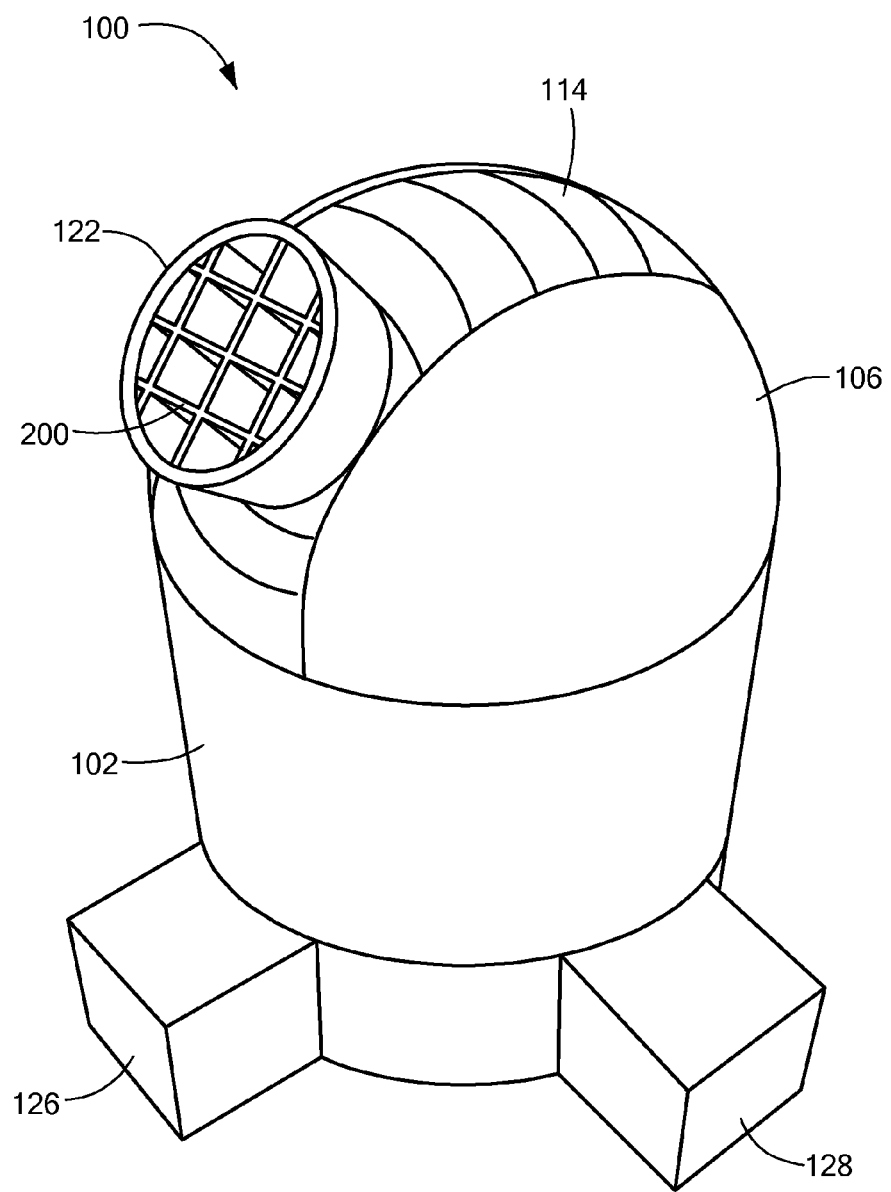
FIG. 2 is a perspective schematic view of the star tracker of FIG. 1, with addition of a honeycomb baffle, according to an embodiment of the present invention.

In this embodiment, the aperture 120 is surrounded by a coaxial baffle 122. The baffle 122 may be frustoconical, as shown in FIG. 1, or it may be cylindrical or another shape. The inside surface of the baffle 122 may include concentric circular steps (as shown in FIG. 1) and/or a honeycomb baffle 200 (as shown in FIG. 2) to reduce unwanted reflections of stray light. Some other embodiments do not include the baffle 122.

Figure 3:
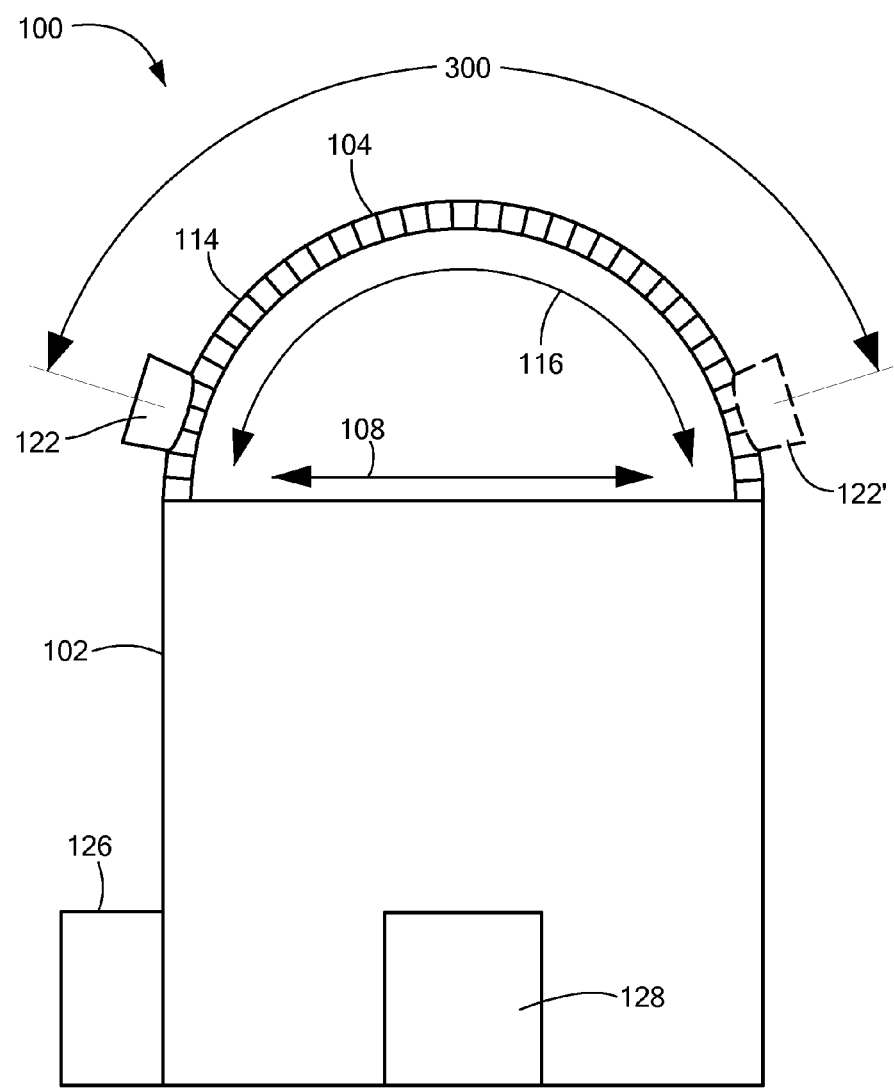
FIG. 3 is a side schematic view of the star tracker of FIG. 1.

FIG. 3 is a side schematic view of the star tracker 100. As noted, the curtain 114 can rotate as indicated by arrow 116. Thus, the baffle 122 and the aperture 120 (not visible in FIG. 3) can be positioned along an arc 300. For example, the baffle 122 may be positioned as shown in FIG. 3, or it may be positioned at another location, exemplified by 122'. Returning to FIG. 1, between rotation of the curtain 114 as indicated by arrow 116 and rotation of the dome 106 as indicated by arrow 108, the aperture 120 can be positioned so as to expose a selected portion of the scene, such as the sky, to the camera, thereby providing the star tracker 100 with a steerable point of view.

Figure 4:
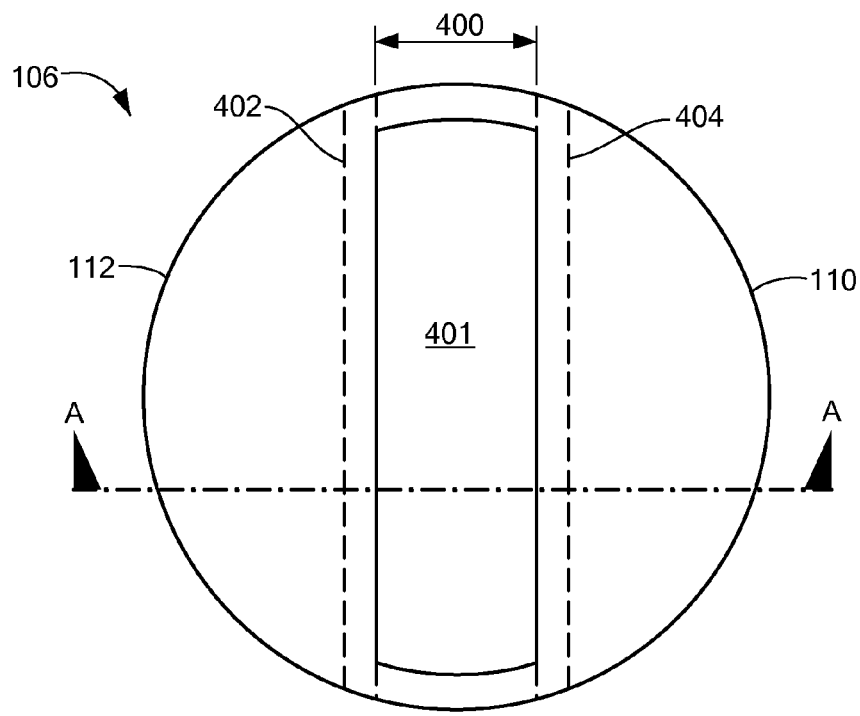
FIG. 4 is a top schematic view of a dome of the star tracker of FIG. 1, according to an embodiment of the present invention.
Figure 5:
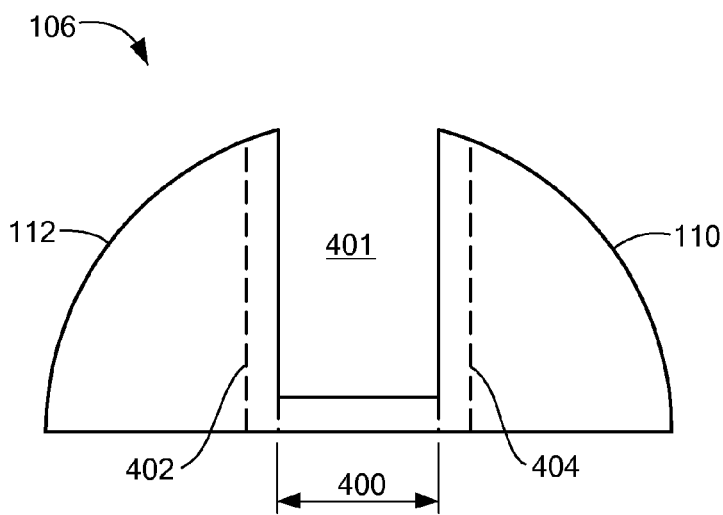
FIG. 5 is a front schematic view of the dome of FIG. 4.
Figure 6:
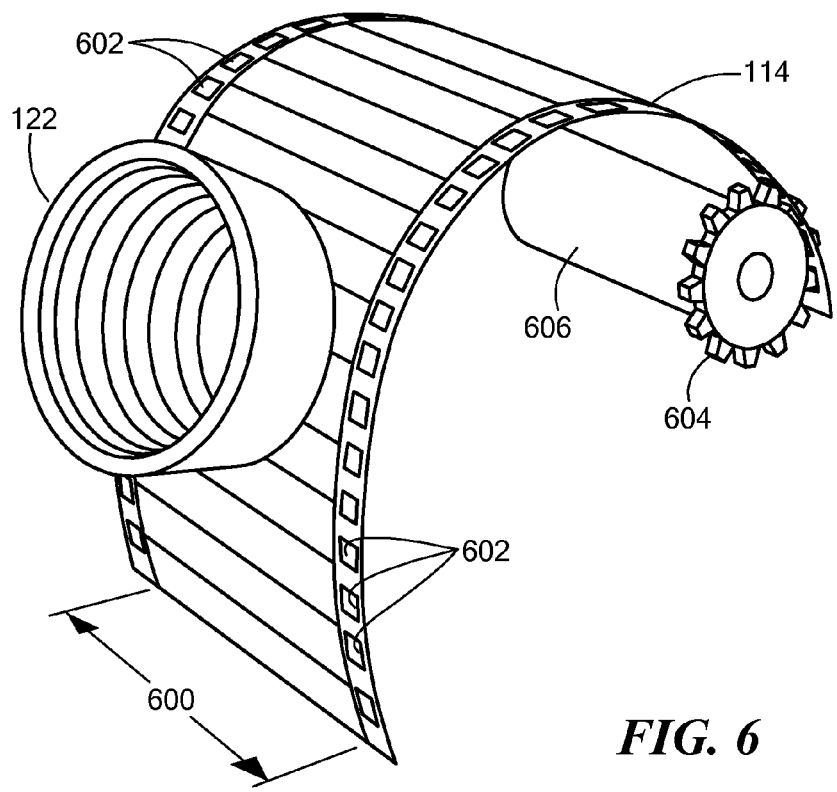
FIG. 6 is a perspective schematic view of a curtain of the star tracker of FIG. 1, according to an embodiment of the present invention.
Figure 7:
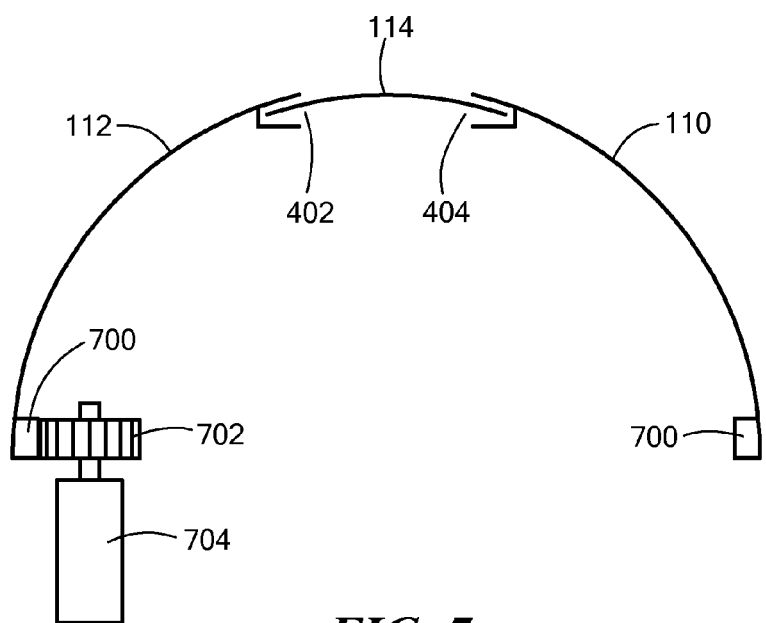
FIG. 7 is a cross-sectional view of the dome of FIG. 4.

FIG. 4 is a top schematic view, and FIG. 5 is a front schematic view, of the dome 106. FIG. 6 is a perspective schematic view of the curtain 114. Width 600 (FIG. 6) of the curtain 114 is greater than width 400 (FIG. 4) of a gap (opening) 401 between the two side portions 110 and 112 of the dome 106. FIG. 7 is a cross-sectional view of the dome 106 of FIG. 4, but also includes the curtain 114. The curtain 114 rides in tracks 402 and 404 along respective inside surfaces of the two side portions 110 and 112 for mechanical support and to prevent stray light entering the baffle assembly 104. The tracks 402 and 404 may be equipped with light seal brushes, foam strips or the like (not shown).

Figure 8:
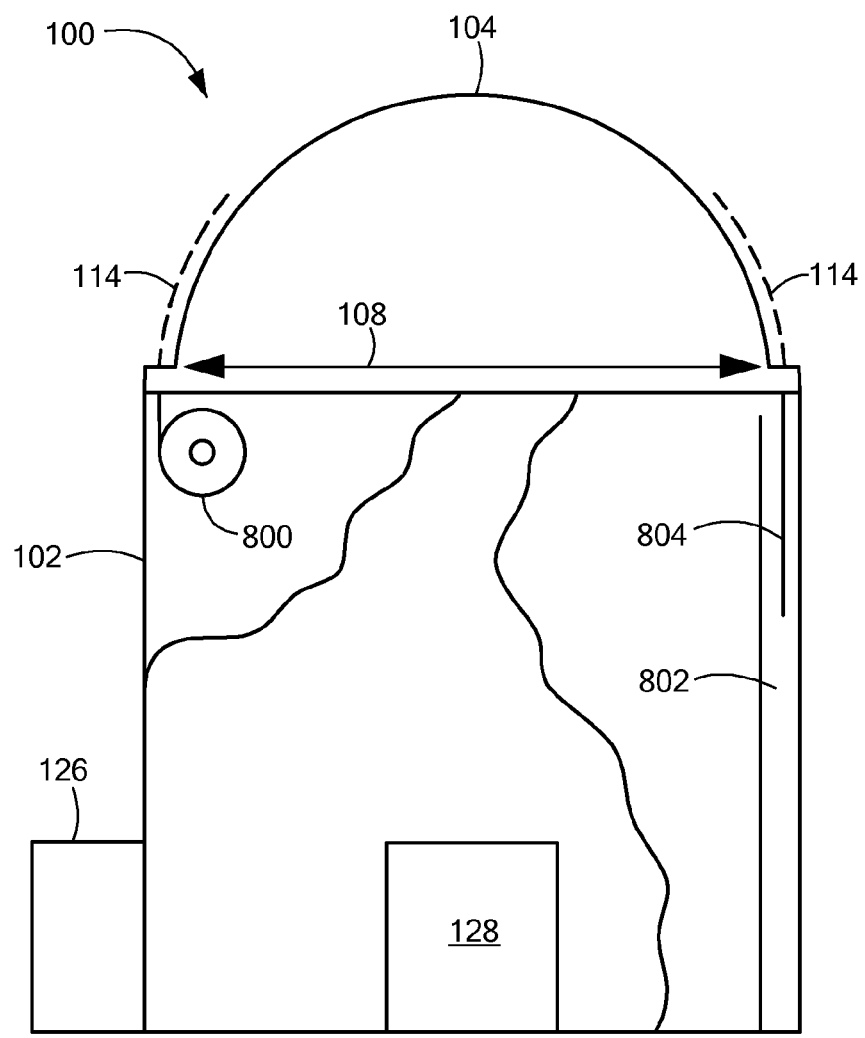
FIG. 8 is a side schematic cut-away view of the star tracker of FIG. 1 illustrating two embodiments for handling excess portions of the curtain of FIG. 6.

As the curtain 114 moves along the tracks 402 and 404, excess portions of the curtain 114, i.e., portions of the curtain 114 not needed to block the gap 401, extend into the body 102, as schematically illustrated in FIG. 8. FIG. 8 is a side schematic cut-away view of the star tracker 100 illustrating two embodiments for handling the excess portions of the curtain 114. In one embodiment, illustrated on the left side of FIG. 8, excess portions of the curtain 114 are wound on a spool 800. The spool 800 may be motor driven or spring wound. The spool 800 is mechanically coupled to the dome 106 for rotation therewith, in the directions of arrow 108.

In the other embodiment, illustrated on the right side of FIG. 8, excess portions of the curtain 114 extend into a pocket 802 defined by an inner wall 804 of the body 102. In yet another embodiment (not illustrated), excess portions of the curtain 114 accordion fold into a trough defined inside the body 102 or depending from the dome 106.

The curtain 114 may define sprocket holes 602 (FIG. 6) adjacent its two long edges. These sprocket holes 602 may be engaged by a sprocket gear 604 driven by a motor 606 to move the curtain 114 along the tracks 402 and 404. Similarly, the dome 106 may include a rack gear 700 (FIG. 7) along its inside perimeter. This rack gear 700 may be engaged by a pinion gear 702 driven by a motor 704 to rotate the dome 106 to a desired position, relative to the body 102 of the star tracker 100. The curtain 114 may be made of a single flexible member, or it may include several flexible or rigid individual members (as suggested by lines, such as line 124, in FIG. 1) hingedly or otherwise chained together. The curtain 114, or sections thereof, may be pulled from the body 102, and it or they may ride in a slot to keep it or them aligned to the rest of the hemispherical dome 104.

Camera

Figure 9:
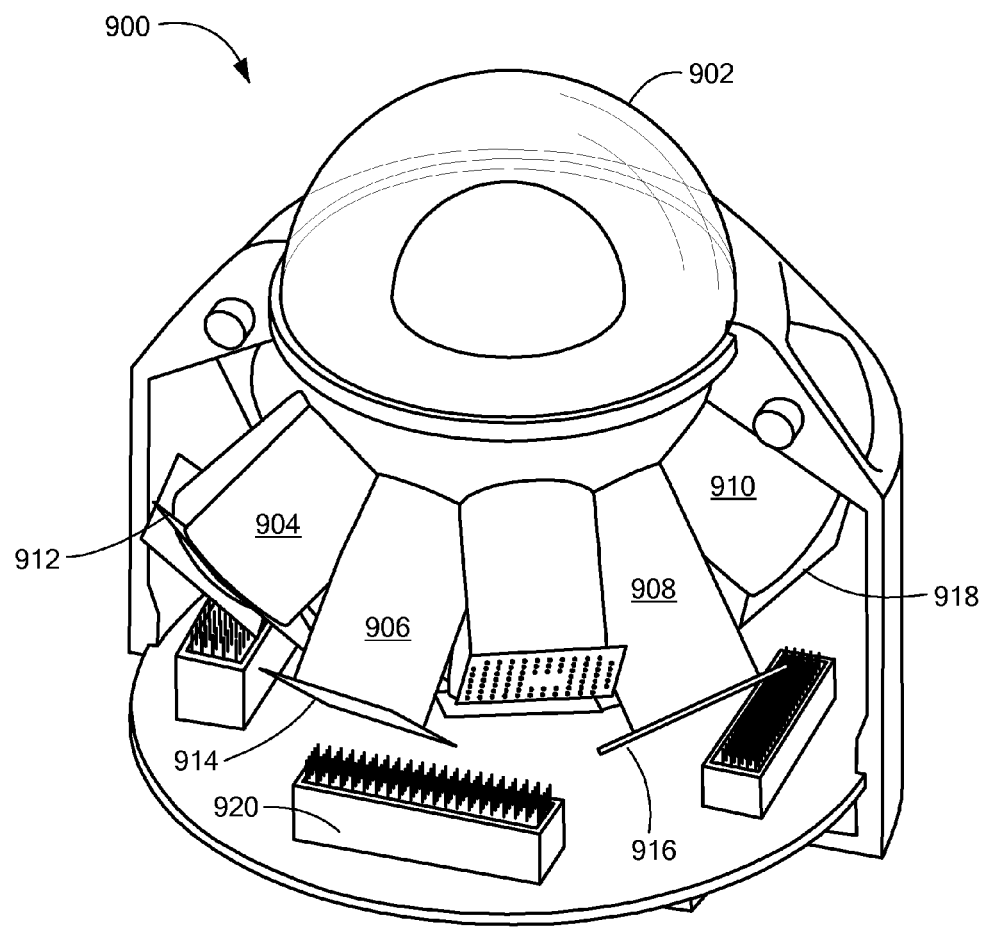
FIG. 9 is a perspective schematic view of a wide field-of-view camera having a spherical objective lens.

As noted, the star tracker 100 may include a wide field-of-view camera within the body 102. FIG. 9 is a perspective schematic view of an exemplary wide field-of-view camera 900 having a spherical objective lens 902. The lens 902 is coupled via a plurality of approximately 8.5-14 mm long optical fiber bundles, exemplified by fiber bundles 904, 906, 908 and 910, to respective square, rectangular or other shaped pixelated planar image sensor arrays, exemplified by arrays 912, 914, 916 and 918. Each optical fiber should be polished to match the spherical surface of the lens 902. The optical fibers should be subject to at most very little physical distortion (on the order of <<1%), if the image sensor pitch matches the fiber bundle pitch. Suitable fiber bundles (2.4 mm pitch, N.A.=1, 1.84/1.48 core clad index) are available from SCHOTT Corporation (SCHOTT North America, Inc., 555 Taxter Road, Elmsford, N.Y. 10523). Thus, each image sensor array 912-918, etc. receives light from a portion of the camera's field of view.

Figure 12:
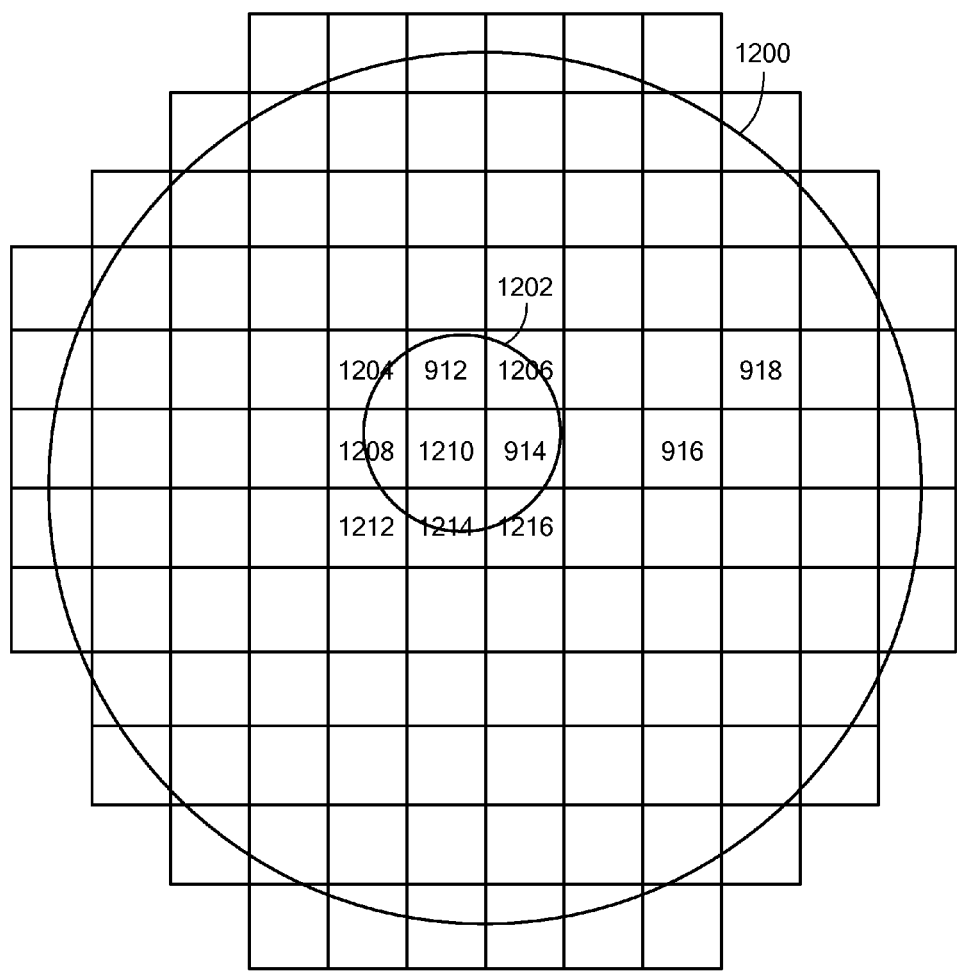
FIG. 12 schematically illustrates a hypothetical tiling of the camera's field of view onto a plurality of image sensors, according to an embodiment of the present invention.

FIG. 12 schematically illustrates a hypothetical tiling of the camera's field of view 1200 onto a plurality of rectangular image sensors, exemplified by image sensor arrays 912-918, 1204, 1206, 1208, 1210, 1212, 1214 and 1216. Returning to FIG. 9, multi-pin connectors, such as connector 920, accept flexible printed wiring or other suitable cables to interconnect the camera 900 to a processor or other image-processing circuitry (not shown). Multiple high bandwidth multi-lane low-voltage differential signaling (LVDS) data channels may be used to couple the image sensor arrays 912-918, etc. to one or more field-programmable gate arrays (FPGAs), and a single high bandwidth SERDES link (operating at approximately 3.2 Gb/sec.) may couple the FPGAs to a CEV or other processor.

Alternatively, the lens 902 may be optically coupled, via optical fibers, a gap or another intermediary, to one or more spherical cap-shaped sensor arrays (not shown).

Figure 10:
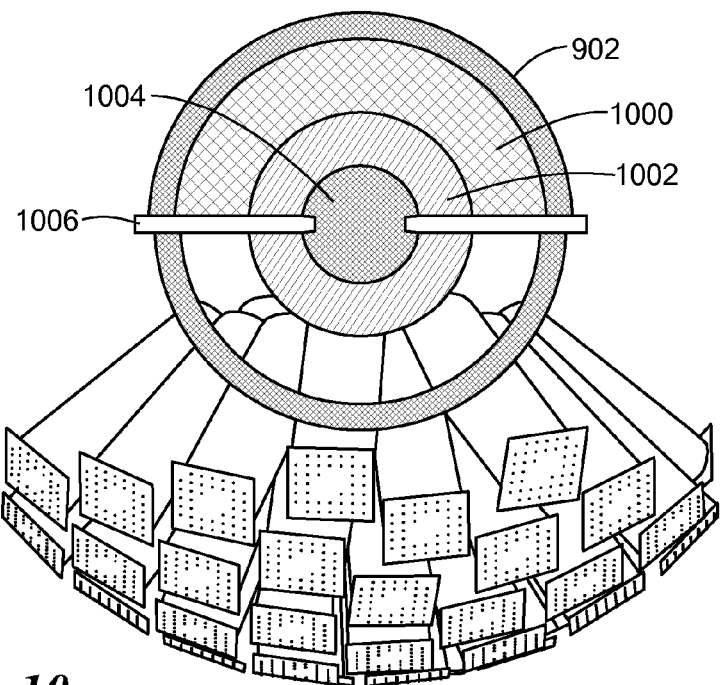
FIG. 10 is a side schematic view of the camera of FIG. 9, including a cross-sectional view of the spherical objective lens.

As shown schematically in FIG. 10, the lens 902 may include a plurality of monocentric shells, exemplified by shells 1000 and 1002, to correct for spherical and chromatic aberrations. (The camera shown in FIG. 10 includes more image sensor arrays than the camera shown in FIG. 9.) The lens 902 may include a central approximately 4 mm diameter aperture 1004 defined by a fixed or adjustable iris 1006.

Figure 11:
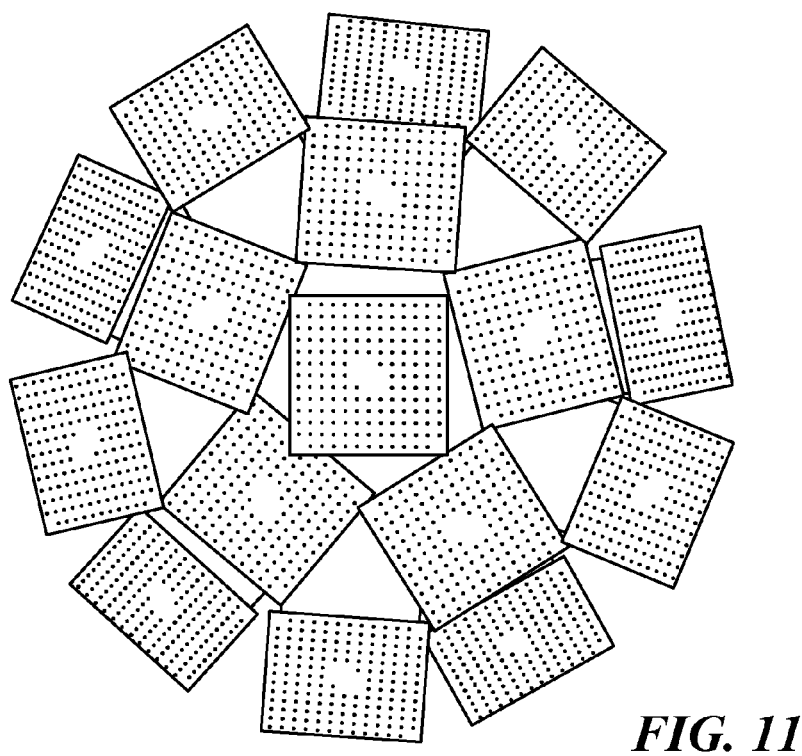
FIG. 11 is a bottom schematic view of the camera of FIG. 9.

FIG. 11 is a bottom schematic view of the camera of FIG. 10 showing a plurality of planar image sensor arrays.

Additional information about a suitable camera is available in "Optimization of two-glass monocentric lenses for compact panoramic imagers: general aberration analysis and specific designs," by Igor Stamenov, Ilya P. Agurok and Joseph E. Ford, Applied Optics, Vol. 51, No. 31, Nov. 1, 2012, pp. 7648-7661, as well as U.S. Pat. No. 3,166,623 titled "Spherical Lens Imaging Device," by J. A. Waidelch, Jr., filed Dec. 29, 1960, the entire contents of all of which are hereby incorporated by reference herein. The camera 900 is conceptually similar to a larger monocentric objective camera called AWARE2 and developed at Duke University.

Figure 13:
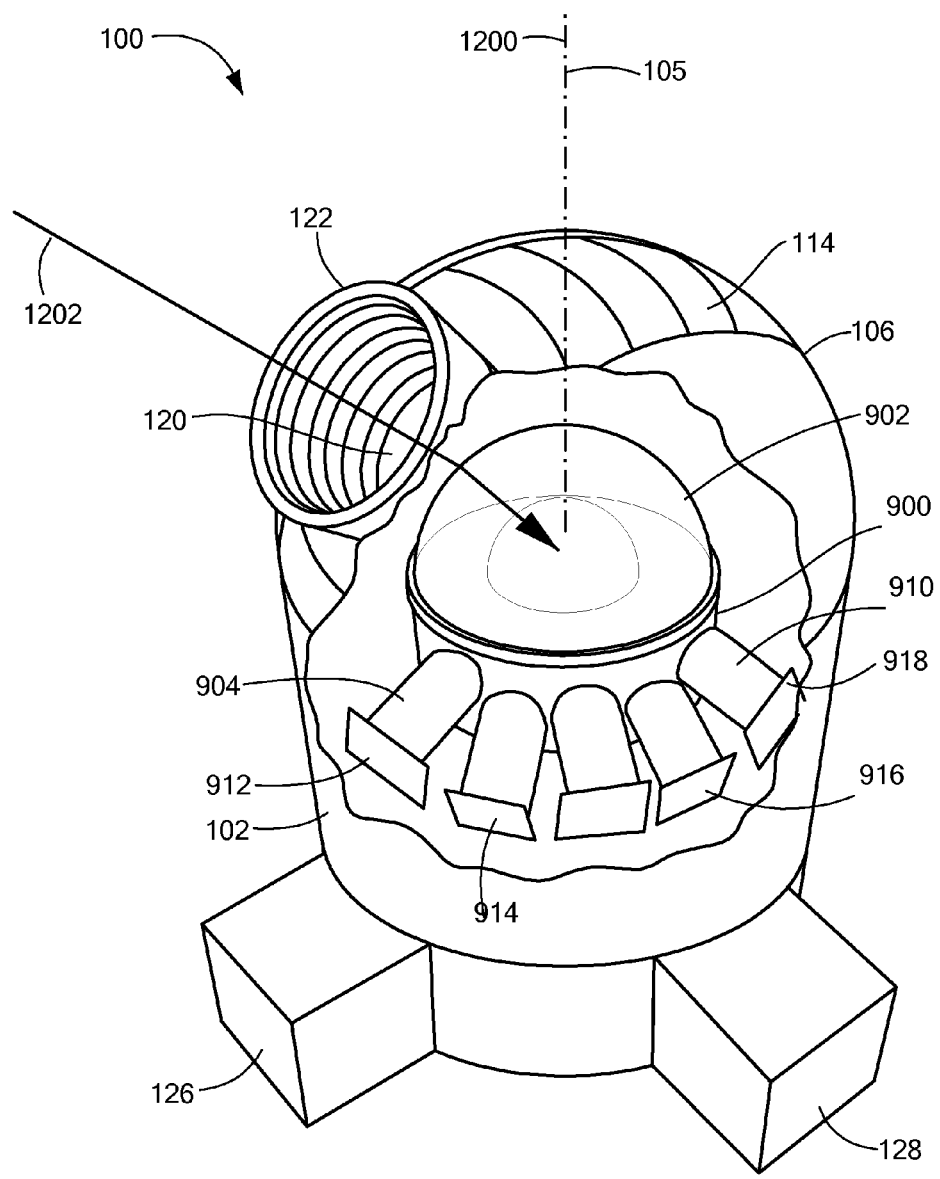
FIG. 13 is a cut-away view of the star tracker of FIG. 1 illustrating placement of the camera of FIG. 9 within a body of the star tracker, according to an embodiment of the present invention.

FIG. 13 is a cut-away view of the star tracker 100 illustrating placement of the camera 900 within the body 102. The camera 900 optical axis 1200 aligns with the axis 105 (FIG. 1) of the body 102. In an embodiment, the camera 900 has a 120° field of view, although cameras with other fields of view may be used. However, the dome 106 and the curtain 114 block all of the camera's field of view, except through the aperture 120. Thus, size and shape of the aperture 120 and configuration (size, shape and length) of the baffle 122 (if any), as well as rotational position of the curtain 114 along the arc 300 (FIG. 3) and rotational position of the dome 106, relative to the body 102, i.e., along the direction of the arrow 108 (FIG. 1), determine which portion of the camera's field of view is exposed ("the selectable portion of the camera field of view") to a scene. In one embodiment the aperture 120 and the baffle 122 limit the portion of the camera's field of view to about 3-4°, however in other embodiments, the camera's field of view may be limited to larger or smaller angles, such as about 1°, 10° or other angles.

For example, as shown in FIG. 13, light traveling toward the star tracker 100 along a path 1202 is passed by the aperture 120 to the lens 902 and thence to a corresponding one or more pixels on one or more of the image sensors 912-918. The path 1202 is referred to herein as "an optical axis of the selectable portion of the camera field of view." FIG. 12 illustrates a hypothetical portion 1202 of the camera's field of view that is exposed by the aperture 120 to the scene. In the example illustrated in FIG. 12, the selectable portion of the camera field of view spans more than one image sensor array 912, 914, 1204, 1206, 1208, 1210, 1212, 1214 and 1216. However, with other size apertures 120, other configurations of the baffle 122 and/or other size image sensor arrays, the selectable portion of the camera field of view may span more of fewer image sensor arrays.

Figure 14:
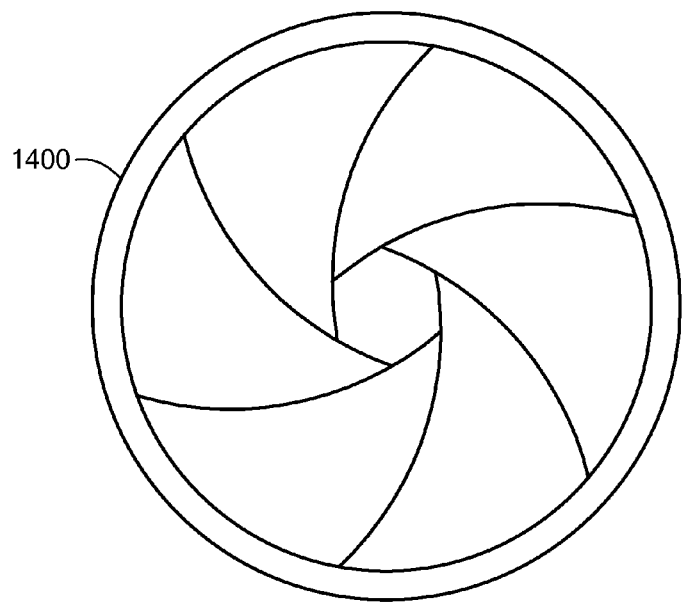
FIG. 14 is a front schematic view of an adjustable iris.
Figure 15:
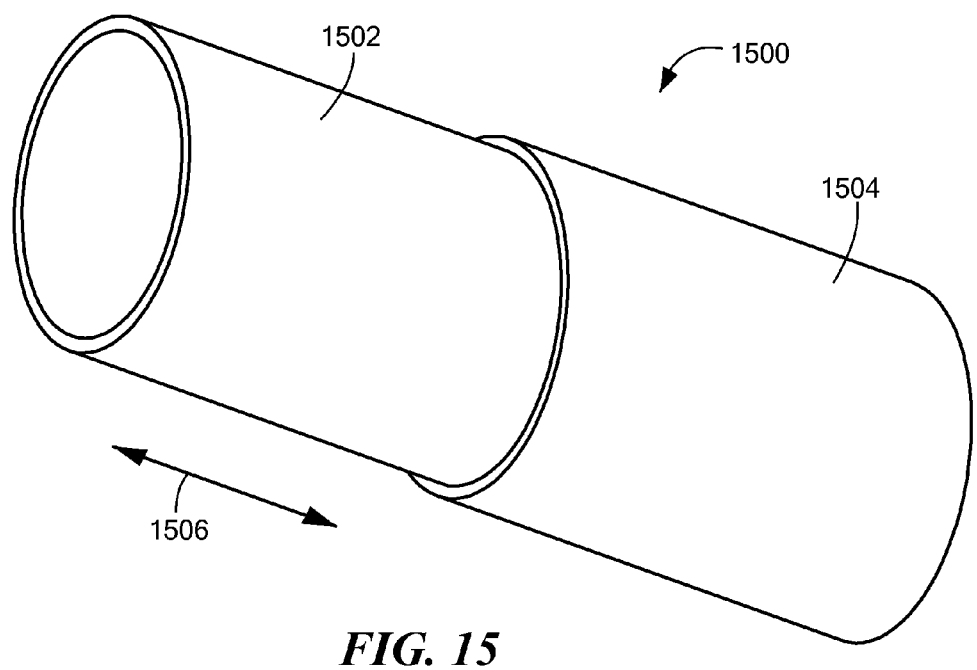
FIG. 15 is a perspective schematic view of an adjustable telescopic baffle.

The size of the aperture 120 and the configuration of the baffle 122 (if any) determine the size of the selectable portion of the camera field of view. Other embodiments may include variable apertures, such as an adjustable iris 1400 shown in FIG. 14, and/or variable baffles, such as a telescopic baffle 1500 shown in FIG. 15. Opening or closing the adjustable iris 1400, such as by a drive motor (not shown in FIG. 14, but discussed below), varies an amount of the scene exposed to the camera. Extending or retracting an inner baffle tube 1502, relative to an outer baffle tube 1504, as indicated by arrow 1506, varies an amount of the scene exposed to the camera. The inner and outer baffle tubes 1502 and 1504 may, in some embodiments, be matingly threaded, such that rotating the inner baffle tube 1502 by a motor (not shown in FIG. 15, but discussed below), relative to the outer baffle tube 1504, extends or retracts the inner baffle tube 1502.

Angular Rate Sensors

Some embodiments of the star tracker include mutually perpendicular angular rate sensors 126 and 128 (FIG. 1), both oriented perpendicular to the axis 105 of the body 102. These rate sensors 126 and 128 may be used by a controller (described below) to sense movement, such as vibration, of the star tracker 100 and to compensate for this movement while analyzing images from the sensors 912-918, etc. Such compensation may be advantageous in cases where the star tracker 100 experiences vibrations having a frequency greater than about 100 Hz. Such compensation allows the camera 900 or a controller to maintain knowledge of the direction of sightings, relative to previous sighting, to ensure accuracy of positions that are ascertained based on multiple sightings.

Controller and Block Diagram

Figure 16:
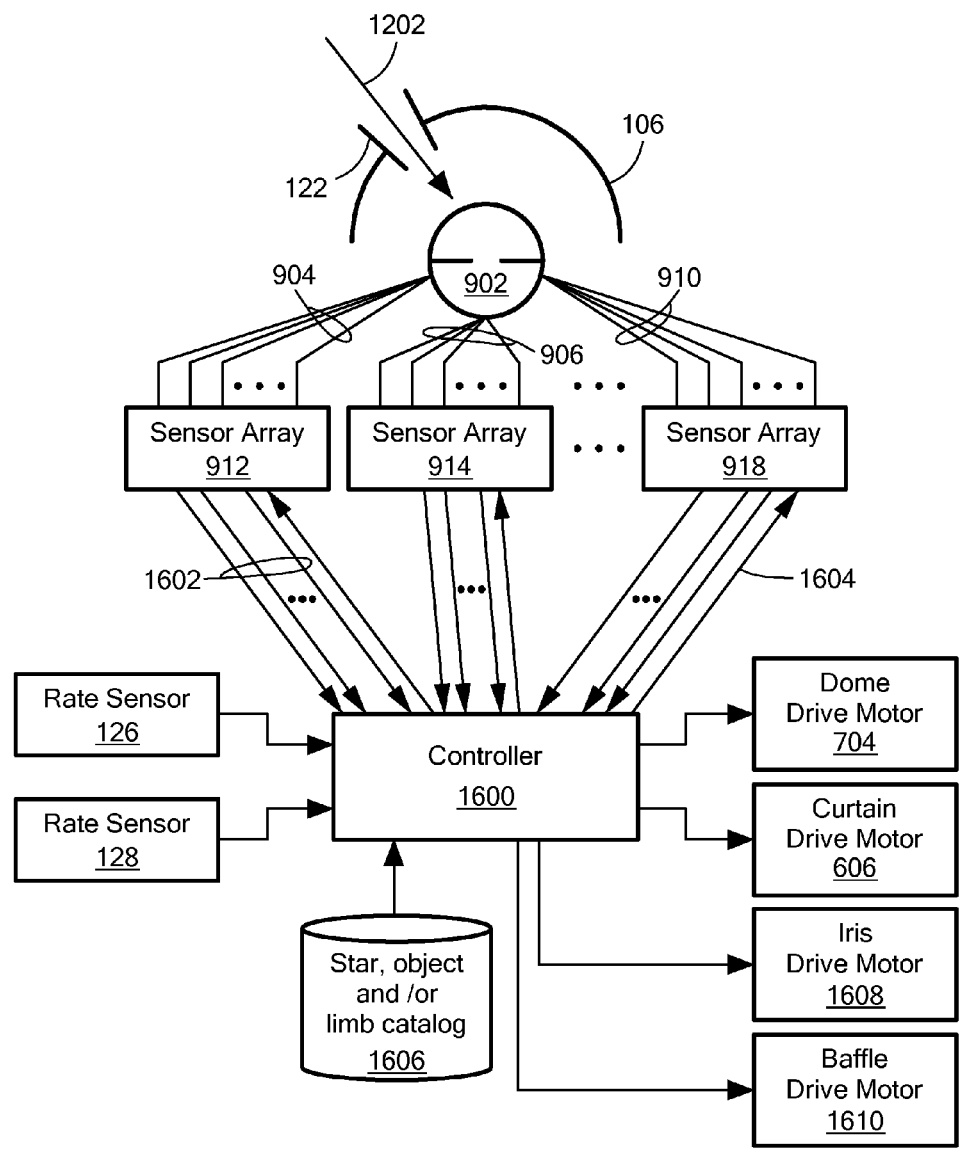
FIG. 16 is a schematic block diagram of the star tracker of FIG. 1, according to an embodiment of the present invention.

FIG. 16 is a schematic block diagram of an embodiment of the present invention. A processor-driven controller 1600 is coupled to the rate sensors 126 and 128, the sensor arrays 912-918, etc., the dome drive motor 704 and the curtain drive motor 606 to receive signals and/or to control operations of these items, as described herein. For example, pixel data may be sent by the image sensors 912-918, etc. to the controller 1600, as exemplified by connections 1602, and the controller may initiate an exposure, control length of the exposure and send other commands, such as to control which pixels are to be read, via control signals, as exemplified by connection 1604. A star catalog 1606 stores information about star locations. The star catalog 1606 may be stored in a non-volatile memory, such as a read-only memory (ROM). If the embodiment includes an adjustable iris and/or a variable baffle, the controller 1600 is coupled to an iris drive motor 1608 and/or a baffle drive motor 1610, as appropriate.

The controller 1600 may include a processor configured to execute instructions stored in a memory. Conceptually, the processor of the controller 1600 may process data from the rate sensors 126 and 128, or the controller may include a separate processor or other circuit, such as one or more field programmable gate arrays (FPGAs), to process the data from the rate sensors 126 and 128 and compensate for vibrations experienced by the star tracker.

Although mechanical domes, curtains, baffles and irises have been described, these items are driven by motors, which are controlled by the controller 1600. Thus, these items are referred to herein as being "electronically adjustable." Collectively, the dome, curtain, baffle (if any) and iris (if any) form an adjustable baffle assembly that is configured to expose a selectable portion of the camera field of view to a scene, such as the sky. The selectable portion of the camera field of view is less than the native field of view of the camera.

Pixelated Dome

Figure 17:
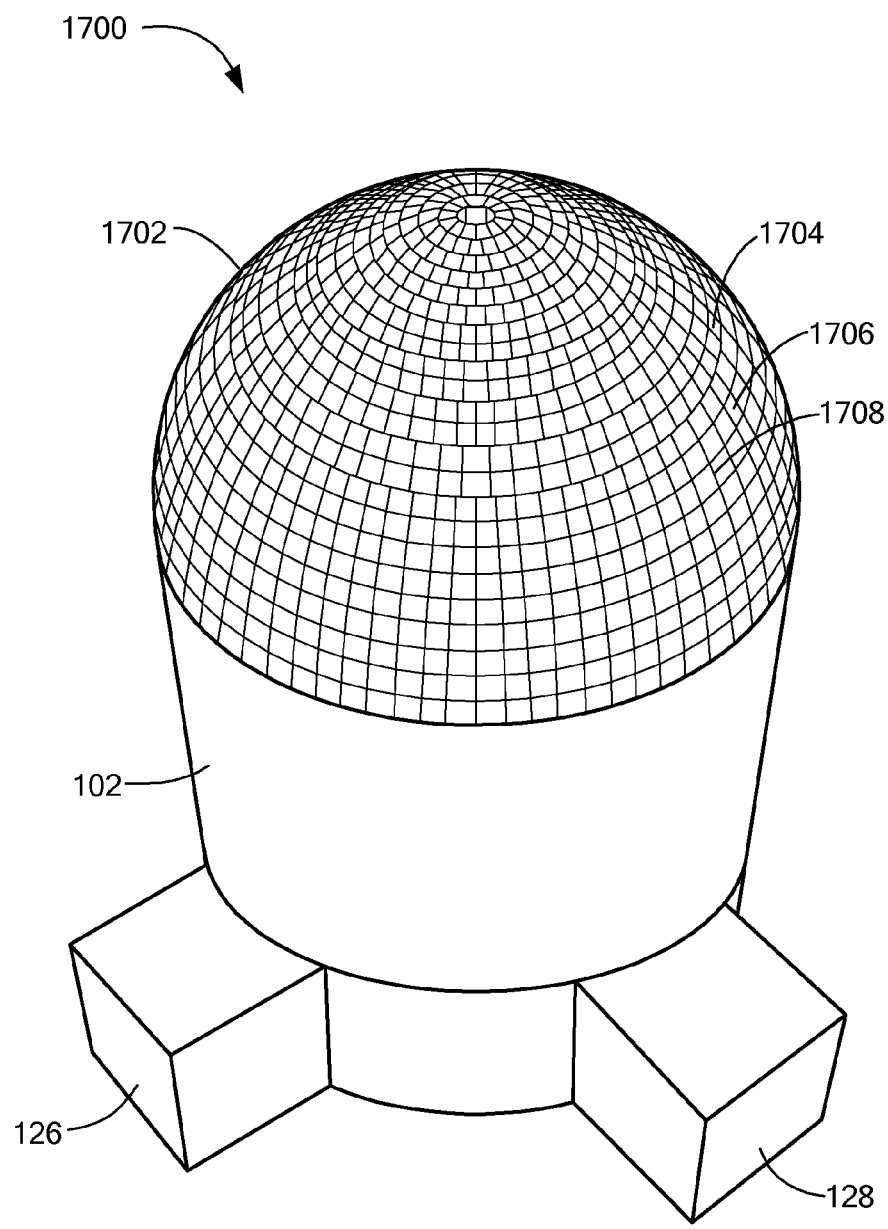
FIG. 17 is a perspective schematic view of a star tracker with a pixelated dome, according to an embodiment of the present invention.

In some other embodiments, a material whose transparency or translucency (herein collectively referred to as "transparency") can be electronically adjusted is used in the dome to selectively expose a portion of the camera's field of view to a scene. FIG. 17 is a perspective schematic view of one such embodiment of a star tracker 1700 having a pixelated dome 1702 made of, or including, a plurality of individually switchable pixels, exemplified by pixels 1704, 1706 and 1708. Square pixels 1704-1708 are shown; however, other shape pixel may be used. The shape, size, and number of pixels in the dome depend on minimum size and granularity in size desired for the selectable portion of the camera field of view. The pixels 1704-1708, etc. may be constructed using liquid crystals, electrochromic devices, suspended particle devices, micro-blinds or any other type of electro-optic device or material whose transparency is electronically controllable.

Figure 18:
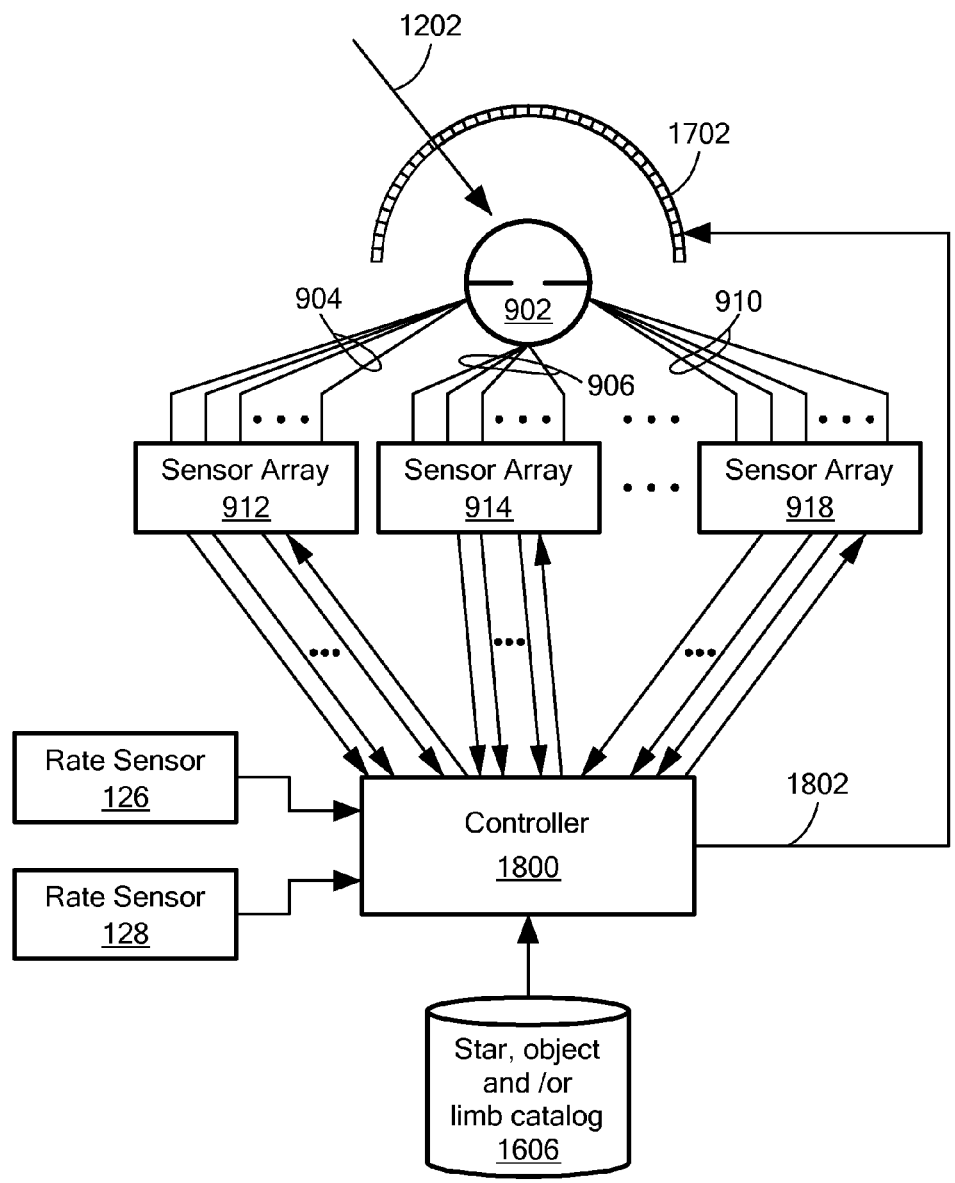
FIG. 18 is a schematic block diagram of the star tracker of FIG. 17, according to an embodiment of the present invention.

FIG. 18 is a schematic block diagram of an embodiment of the present invention that includes a pixelated dome 1702. Most components shown in FIG. 18 are similar to corresponding components described above, with respect to FIG. 16. However, in the embodiment shown of FIG. 18, a controller 1800 controls transparency of individual pixels 1704-1708, etc. of the dome 1702 via control signals 1802. The pixels that are caused to be transparent essentially define an aperture in the dome 1702. Consequently, a selectable portion of the field of view of the camera is exposed to the scene through the transparent pixel(s), and a remaining portion of the field of view of the camera is obscured from the scene by the non-transparent pixels. FIG. 18 shows a gap between an inside surface of the pixelated dome 1702 and a surface of the lens 902. However, in some embodiments, the pixelated dome 1702 is attached to the surface of the lens 902.

Figure 19:
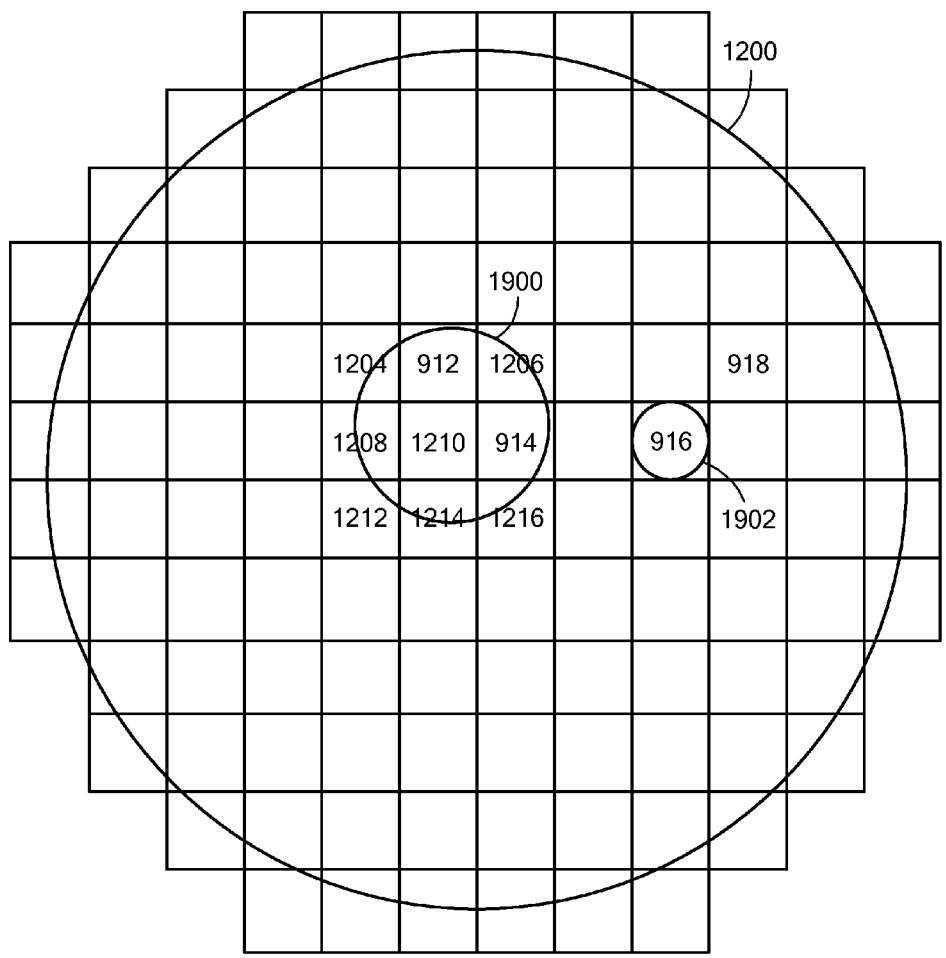
FIG. 19 schematically illustrates a hypothetical tiling of two simultaneous camera fields of view onto a plurality of image sensors, according to an embodiment of the present invention.

The controller 1800 can cause two or more discontiguous groups of the pixels 1704-1708, etc. to be transparent, essentially creating two or more apertures in the dome 1702. Thus, the dome 1702 can expose an arbitrary number of discontiguous regions of the field of view of the camera to a scene. For example, FIG. 19 schematically illustrates a hypothetical tiling of two simultaneous camera fields of view 1900 and 1902 onto the camera's image sensor arrays 912-918, etc. It should be noted that the two fields of view can, but need not, be of different sizes and/or different shapes. Other numbers and/or shapes of fields of view may be used. Multiple simultaneous fields of view enable the start tracker 1700 to simultaneously image several navigational stars, while blocking unwanted light from other stars or very bright objects, such as the sun.

Selective Readout from Image Sensor Arrays

In some embodiments, the total number of pixels in all the image sensor arrays 912-918, etc. exceeds 50 million. However, only a portion of these pixels may be exposed to a scene, regardless of whether a movable curtain-defined aperture 120 (FIG. 1) or a pixelated dome 1702 (FIG. 17) is used, and regardless of whether one or more simultaneous apertures are defined. In some embodiments, after the camera captures an image, the controller 1600 or 1800 reads all pixels of only selected ones of the sensor arrays 912-918, etc., depending on which one or more of the sensor arrays 912-918, etc. were exposed to portions of the scene. In some embodiments, the controller 1600 or 1800 reads only selected ones of the pixels in the sensor arrays 912-918, etc. that were exposed to portions of the scene.

By reading all the pixels of only a subset of the sensor arrays 912-918, etc., or by reading only selected pixels of the subset of the sensor arrays, image data may be read more quickly than if all pixels of the selected sensor arrays were read or if all pixels of all the sensor arrays were read. Time saved by not reading all the pixels may be used to capture additional images or to reduce time between successive images, thereby increasing angular resolution. Furthermore, not reading all the pixels saves electrical power, which may be limited in some vehicles.

On the other hand, some position determining algorithms perform better when provided with data from wider fields of view, compared to centroiding only one or a small number of stars. However, as noted, wide fields of view correspond to large numbers of pixels. Some embodiments use linear compressive sensing. In these embodiments, the camera 900 or sensor arrays 912-918, etc. compress the image data, thereby reducing the amount of data sent to the controller 1600 or 1800, and the controller analyzes the image data in the compressed domain. In these embodiments, the star catalog 1606 may also be compressed. For additional information about such compression, reference should be had to U.S. patent application Ser. No. 12/895,004 (U.S. Pat. Publ. No. 2012/0082393) titled "Attitude Estimation with Compressive Sampling of Starfield Data" filed Sep. 30, 2010 by Benjamin F. Lane, et al., which is assigned to the assignee of the present application, the entire contents of which are hereby incorporated by reference herein.

Stellar Horizon Atmospheric Dispersion or Refraction (SHAD/SHAR)

As noted, a star tracker measures bearing(s) to one or more navigational stars and uses information in a star catalog to locate itself, and its associated vehicle, in space. However, instead of imaging a navigational star through clear space, a star tracker may image the navigational star through an atmospheric limb of the earth. As viewed from space, a star passing behind earth's upper atmosphere appears to shift upward, i.e., away from the center of the earth, from its true position due to refraction of the star's light as the light passes through the atmosphere. The amount of refraction depends on frequency of the starlight and atmospheric density.

A measurement of the refraction of a known star's light near the horizon can be used to infer a direction, in inertial space, from the measurement point, toward the portion of the atmosphere that refracted the light. A star tracker can directly measure this refraction. Alternatively, a difference in refraction, i.e., dispersion, between two different wavelengths, such as red and blue, of starlight can be measured. This concept is referred to as stellar horizon atmospheric dispersion ("SHAD"). However, it should be noted that these two methods are merely different ways of measuring the same basic phenomenon. The relationship between refraction and dispersion is well known for air. Using measured refraction for inferring direction is called stellar horizon atmospheric refraction ("SHAR"). Embodiments of the present invention may be used for SHAD- and SHAR-based navigation.

Figure 20:
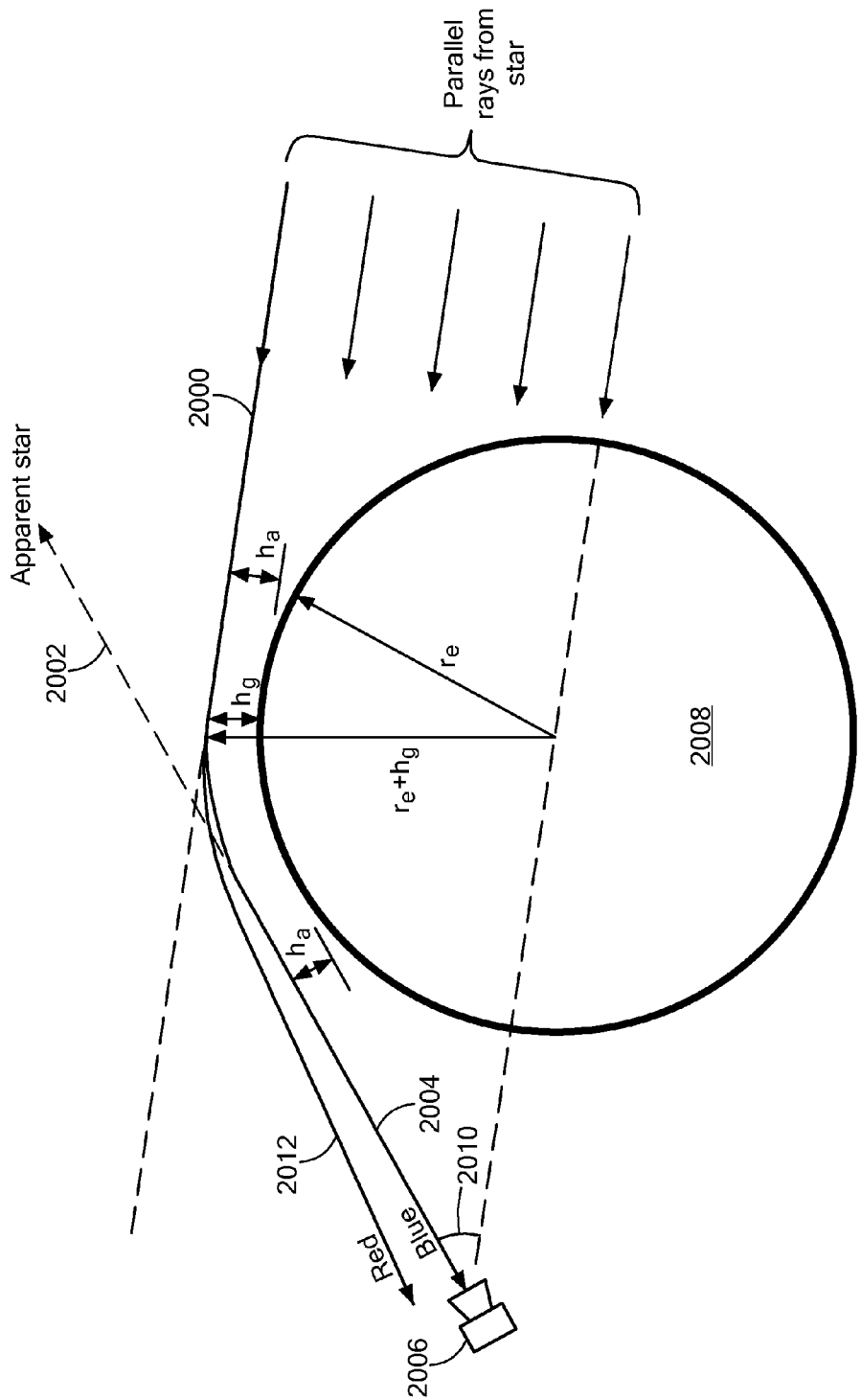
FIG. 20 schematically illustrates refraction and dispersion of light from a navigational star by the atmosphere of the earth, as seen from a space vehicle, according to the prior art principles known as stellar horizon atmospheric refraction ("SHAR") and stellar horizon atmospheric dispersion ("SHAD").

As noted, passage of starlight 2000 through the earth's atmosphere bends rays of the starlight inward, as shown schematically in FIG. 20. Viewed from space, the star's apparent position 2002 remains on the horizon long after its true position has "set." A refracted blue ray 2004 observed by the camera 2006 appears to graze the earth 2008 at a height $h_a$, but actually grazes the earth 2008 at a slightly lower height $h_g$. The actual refraction angle is indicated at 2010. The earth's radius is indicated in FIG. 20 as $r_e$.

The refraction is strongest near the surface of the earth 2008, progressively becoming weaker at progressively higher altitudes, due to the decreasing density of the atmosphere. For example, starlight is refracted approximately 330, 150 and 65 arcseconds for grazing heights of 20, 25 and 30 km, respectively. Lower altitudes, such as about 6 km or 9 km, produce larger refractive angles, leading to larger signals and higher accuracies. SHAR is applicable up to about 30° from the horizon and can be used to provide location updates with accuracies on the order of ±3 meters.

In effect, the atmosphere acts like a prism, refracting and dispersing the starlight passing through it. A ray of starlight passing through the spherical shell of the atmosphere encounters the gradient in air density, which determines an amount by which the starlight is bent. Densities of air near the earth's surface are known to be closely described by an exponential function of altitude. The amount of refraction depends on frequency of the starlight. Thus, red light ray 2012 is refracted less than blue light ray 2004.

Figure 21:
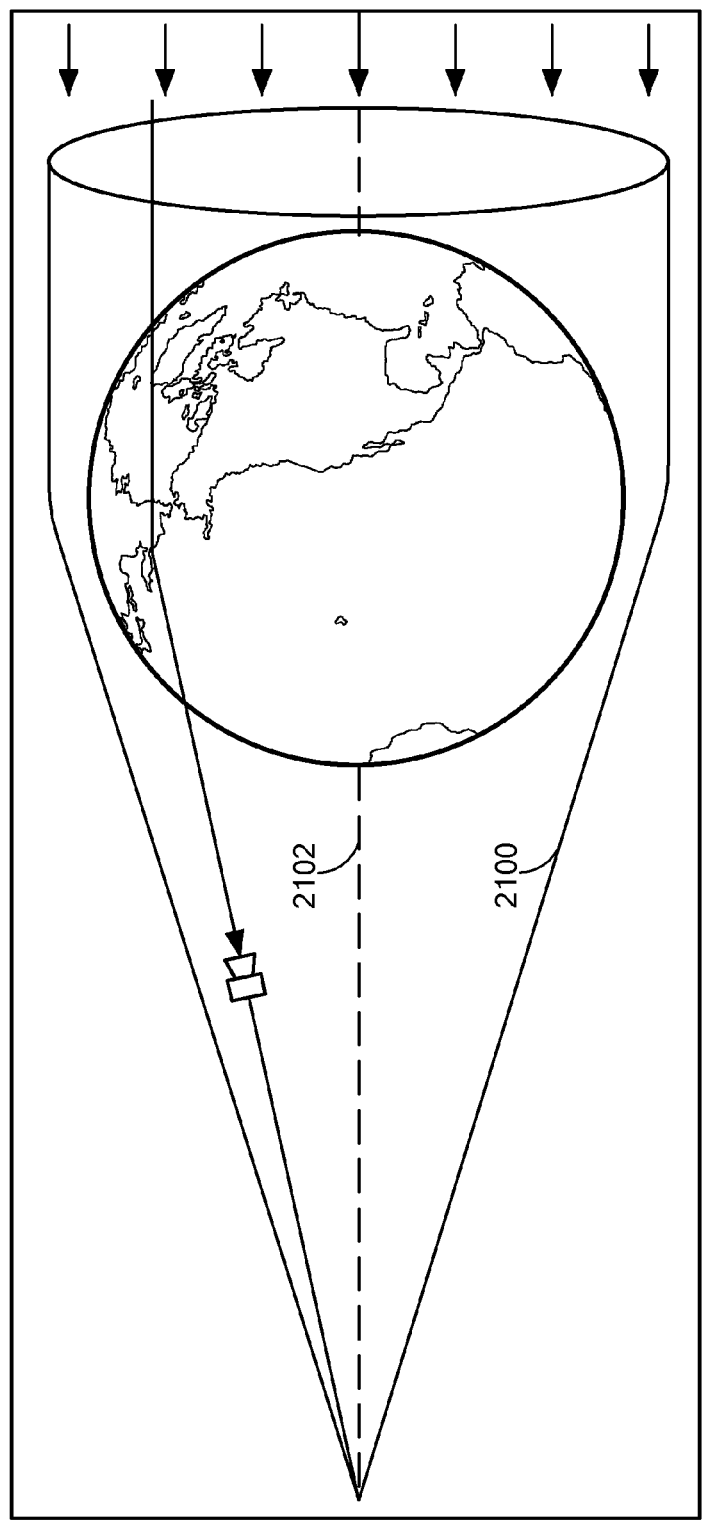
FIG. 21 schematically illustrates starlight refracted by a given amount defining a conceptual conical surface extending into space and having an axis passing through the center of the earth in the direction of a navigational star, according to the prior art principle of stellar horizon atmospheric refraction ("SHAR").

Assuming a spherically symmetric atmosphere, all starlight refracted by a given amount defines a conical surface 2100 extending into space and having an axis 2102 passing through the center of the earth in the direction of the star, as schematically illustrated in FIG. 21. Observation of this particular value of refraction by a vehicle indicates it is somewhere on the surface of the cone 2100. By repeating the same type of observation on stars in different directions, the vehicle can determine its complete position by essentially solving for intersections of the various cones.

However, it is seldom necessary to solve for cone intersection, because the vehicle typically has sufficiently accurate information about its position before each measurement to permit it to use a simpler technique to update its position. At the time of a measurement, the vehicle typically has a prior estimate of its position, which is in the vicinity of a small region of the cone. Because the measurement indicates the vehicle is on the cone, the most probable position is a point on the cone closest to the estimated position. Thus, the vehicle can update its position along a perpendicular line from the estimated vehicle position to the cone surface.

This technique provides positional information in only one dimension. However, similar updates for horizon stars in other directions throughout an orbit or along another trajectory can provide a complete update of position and velocity. The star catalog 1606 (FIGS. 16 and 18) can include data about the atmospheric limb, in addition to ephemeris data about stars, to facilitate SHAR- or SHAD-type navigation using an embodiment of star trackers disclosed herein. It should be noted that SHAR- and SHAD-type navigation are independent of the GPS and ground-based tracking systems. Thus, a star tracker that employs SHAR or SHAD can be autonomous, i.e., independent of any other system.

Additional information about position determination using SHAD or SHAR is available in "Satellite Autonomous Navigation with SHAD," by R. L. White and R. B. Gounley, April, 1987, CSDL-R-1982, The Charles Stark Draper Laboratory, Inc., 555 Technology Square, Cambridge, Mass. 02139, which is the assignee of the present application, the entire contents of which are hereby incorporated by reference herein.

Artificial Satellites as Navigational Reference Points

Although star trackers that use navigational stars has been described, other light-emitting or light-reflecting space objects can be used for navigation. For example, most artificial satellites have predictable orbits or other trajectories and can, therefore, be used instead of, or in addition to, stars for navigation. This concept was originally proposed by The Charles Stark Draper Laboratory, Inc. and named Skymark. The star catalog 1606 (FIGS. 16 and 18) can include ephemeris data about artificial satellites to facilitate Skymark-type navigation using an embodiment of star trackers disclosed herein. Artificial satellites can also be sighted through the atmospheric limb, thereby combining Skymark and SHAR/SHAD techniques. The selectable field of view provided by embodiments of the present invention enable start trackers to image even relatively dim objects that are apparently close to very bright objects.

Methods

Figure 22:
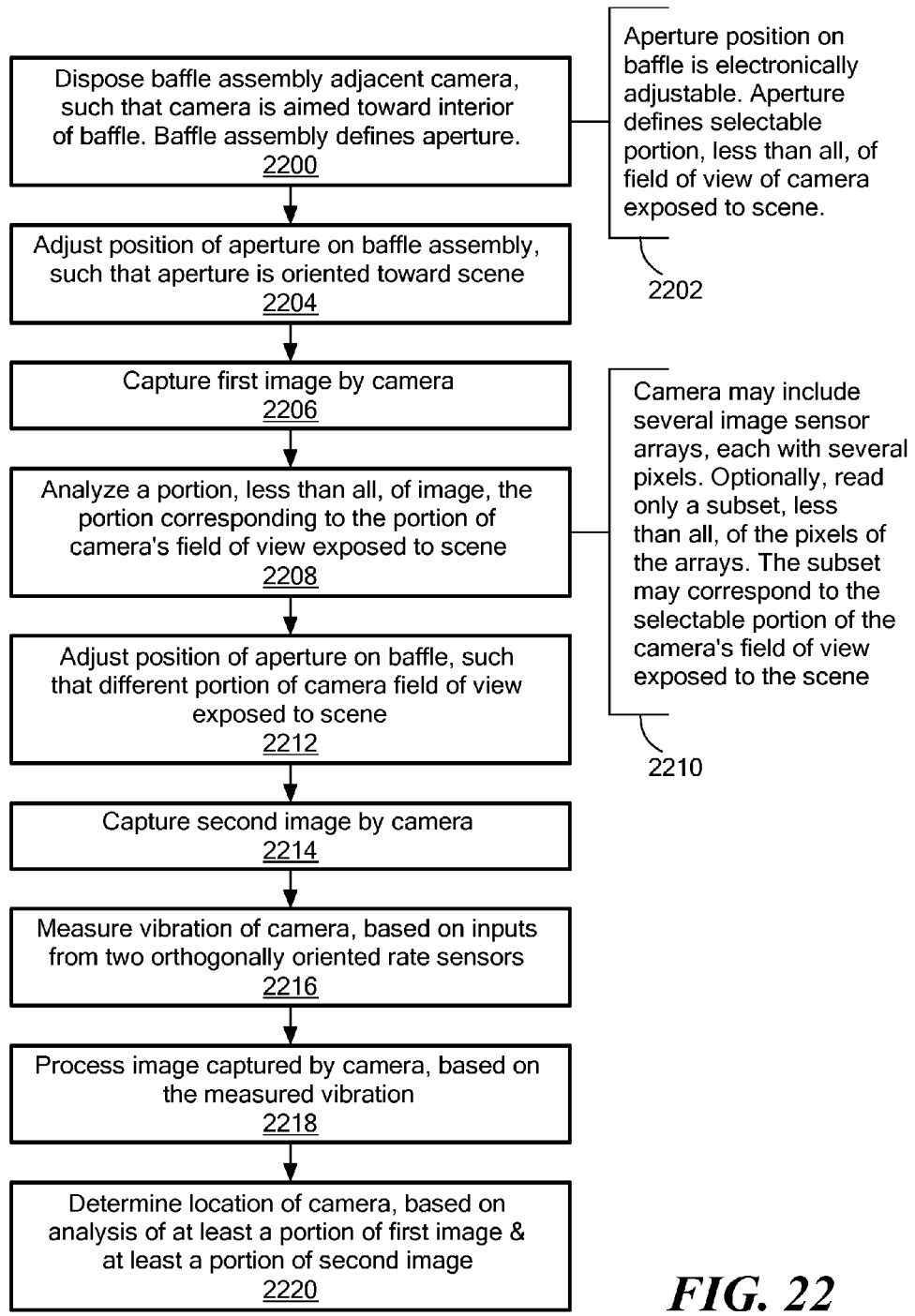
FIG. 22 contains a flowchart illustrating operations of some embodiments of the present invention.

FIG. 22 contains a flowchart illustrating operations of some embodiments of the present invention. To expose a selectable portion, less than all, of a field of view of a camera to a scene, at 2200 a baffle assembly is disposed adjacent the camera, such that the camera is aimed toward an interior of the baffle assembly. As noted at 2202, the baffle assembly is configured to define an aperture whose position on the baffle assembly is electronically adjustable and such that the aperture defines the selectable portion, less than all, of the field of view of the camera exposed to the scene, such as the sky. At 2204, under control of a processor, the position of the aperture on the baffle assembly is adjusted, such that the aperture is oriented toward the scene.

At 2206, a first image is automatically captured by the camera. Optionally, at 2208, a portion, less than all, of the image is automatically analyzed, such as to determine a location in space of the camera. The portion of the image that is analyzed may correspond to the portion of the camera field of view exposed to the scene. Analyzing only a portion of the image conserves resources that would otherwise be required to analyze image portions that were not exposed to any portion of the scene.

As noted at 2210, the camera may include several image sensor arrays, and each image sensor array may include many pixels. A subset, fewer than all, of the pixels of the sensor arrays may be read. The subset may correspond to the selectable portion of the camera field of view exposed to the scene. Reading only a subset of the pixels conserves resources, such as bandwidth, that would otherwise be required to read all the pixels in the image sensor arrays, thereby reducing time required to read relevant pixels. Generally, the unread pixels were not exposed to any portion of the scene.

After adjusting the position of the aperture (2204) and capturing the first image (2206), at 2212 the position of the aperture can be further adjusted on the baffle assembly, such that a different portion of the camera field of view is exposed to the scene. At 2214, a second image is captured by the camera.

Optionally, as indicated at 2216, vibration of the camera may be measured using two orthogonally oriented rate sensors and, as indicated at 2218, one or more of the captured images may be analyzed based on the vibration. For example, position of one or more space objects in the image(s) may be adjusted to compensate for the vibration. Each image may be adjusted differently, depending on a measured displacement, acceleration or angular rate detected by the sensors.

As indicated at 2220, a location of the camera and, therefore, a vehicle to which the camera is attached, may be determined, based at least in part on an analysis of at least a portion of the first image and, optionally, at least a portion of the second image.

Figure 23:
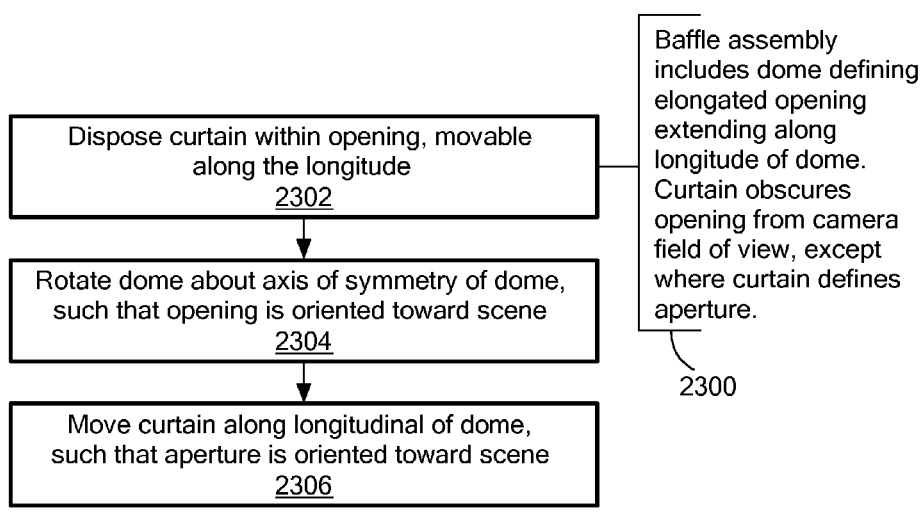
FIG. 23 contains a flowchart illustrating operations that may be performed as part of one of the operations (adjusting an aperture) of FIG. 22, according to some embodiments of the present invention.

As noted, at 2204, the position of the aperture is adjusted. FIG. 23 contains a flowchart illustrating operations that may be performed as part of adjusting the aperture, according to some embodiments of the present invention. As noted at 2300, the baffle assembly may include a dome that defines an elongated opening (gap) extending along a longitude of the dome. At 2302, a curtain is disposed within the opening. The curtain is movable along the longitude of the dome. The curtain obscures the opening from the camera field of view, except where the curtain defines the aperture.

As shown at 2304, adjusting the position of the aperture may include rotating the dome about an axis of symmetry of the dome, such that the opening in the dome is oriented toward the scene. The rotation is performed under control of a processor. Also under control of the processor, at 2306 the curtain is moved along the longitudinal of the dome, such that the aperture is oriented toward the scene.

Figure 24:
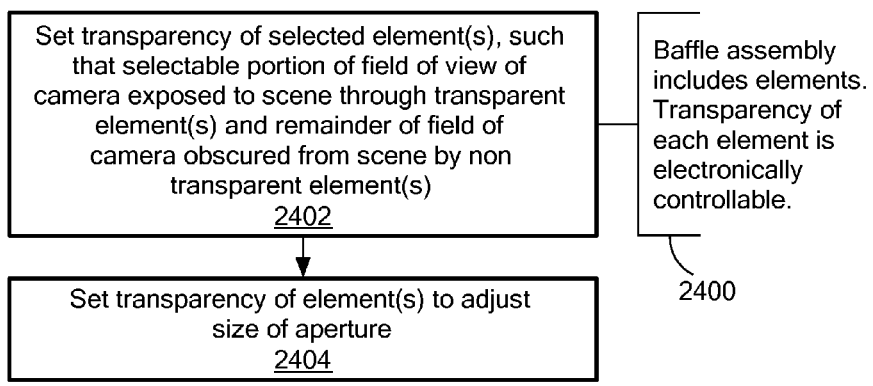
FIG. 24 contains a flowchart illustrating operations that may be performed as part of one of the operations (adjusting an aperture) of FIG. 22, according to some other embodiments of the present invention.

As noted, at 2204, the position of the aperture is adjusted. FIG. 24 contains a flowchart illustrating operations that may be performed as part of adjusting the aperture, according to some embodiments of the present invention. As noted at 2400, the baffle assembly may include a dome that includes elements. Transparency of each element is electronically controllable.

As shown at 2402, adjusting the position of the aperture may include setting transparency of at least a selected one of the elements, such that the selectable portion of the field of view of the camera is exposed to the scene through at least one transparent element, and a remaining portion of the field of view of the camera is obscured from the scene by at least one non-transparent element. The element transparencies are set under control of a processor.

Optionally, at 2404, adjusting the position of the aperture on the baffle assembly may include setting transparency of the selected element to adjust size of the aperture. For example, a group of adjacent elements may be made transparent, and surrounding elements may be made non-transparent. The size of the aperture is determined by the number of adjacent transparent elements, and of course size of each element. The element transparencies are set under control of a processor.

Figure 25:
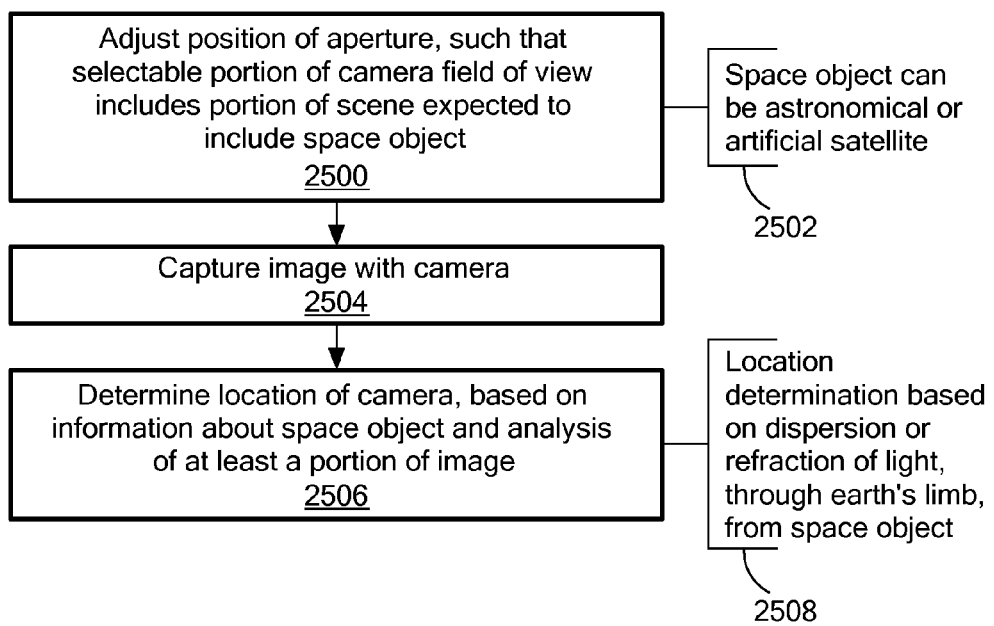
FIG. 25 contains a flowchart illustrating operations that may be performed as part of one of the operations (adjusting an aperture) of FIG. 22, according to some embodiments of the present invention.

As noted, at 2204, the position of the aperture is adjusted. FIG. 25 contains a flowchart illustrating operations that may be performed as part of adjusting the aperture, according to some embodiments of the present invention. At 2500, the aperture is adjusted such that the selectable portion of the camera field of view includes a portion of the scene expected to include a space object having a predictable location. As noted at 2502, the space object may be an astronomical object, such as a star, a planet or a natural satellite, or an artificial satellite.

At 2504, an image is captured with the camera, and at 2506 a location of the camera is automatically determined, based at least in part on information about the space object and an analysis of at least a portion of the image. As noted at 2508, determining the location of the camera may include determining the location based at least in part on dispersion or refraction of light from the space object through earth's atmospheric limb, such as using a SHAD or SHAR technique.

Implementation Details

Some star trackers, according to the present disclosure, can provide navigational accuracy approximately equivalent to the GPS, i.e., an error of approximately ±3 meters. Earth's circumference is approximately 40,075 km, and it has 360° of circumference. Equation (1) shows that approximately 0.097 arcseconds of sighting accuracy is needed to achieve ±3 meters in positional accuracy.

$$(3/40075000)*360° = 0.097 \text{ arcseconds} \quad (1)$$

System accuracy is determined by the field of view subtended by each pixel in the camera's image sensor arrays 912-918, etc., known as an instantaneous field of view (iFOV). Using standard centroiding techniques, sub-pixel accuracy can be achieved. In one embodiment, the objective lens 902 has a 120° (2.09 rad) field of view, and each pixel in the camera's image sensor arrays is about 8.5 µm across and has an iFOV of 0.2 mrad (40 arcseconds). The lens has an F number of about 1.7. Equation (2) shows that approximately 10,472 pixels are necessary to diagonally cover a 120° (camera) field of view.

$$(2.09 \text{ rad}/0.2 \text{ mrad}) \approx 10{,}472 \text{ pixels} \quad (2)$$

Assuming each image sensor array 912-918, etc. has an aspect ratio of 16:9 and the image sensor arrays 912-918, etc. are conceptually concatenated to form a rectangular image area (also having a 16:9 aspect ratio), a corner-to-corner diagonal of the concatenated image area has an angle of 29.36°. Equations (3), (4) and (5) show the number of horizontal pixels, the number of vertical pixels and the total number of pixels in the concatenated image area.

$$10472*\cos(29.36°) = 9127 \text{ pixels(horizontal)} \quad (3)$$

$$10472*\sin(29.36°) = 5134 \text{ pixels(vertical)} \quad (4)$$

$$9127*5134 = 46{,}858{,}656 \text{ pixels(total)} \quad (5)$$

Thus, the total number of pixels in all the image sensor arrays is approximately 50 million.

Sighting accuracy is determined by brightness of the star being observed, compared to noise of the camera, i.e., a signal-to-noise ratio (SNR). The SNR limits an extent to which the centroid of the star can be accurately determined and sets a design parameter for the celestial sighting system. Calculations have shown a 2.5 cm aperture 120 meets the 0.1 arcsecond accuracy needed to achieve ±3 meter positional accuracy, as summarized in Table 1.

TABLE 1

| Sighting accuracy calculation assumptions | |
| --- | --- |
| Star magnitude | 3 |
| Effective aperture diameter | 2.5 cm |
| Quantum efficiency (pixel) | 0.75 |
| Dark current noise | 2.12 e/exposure |
| Read noise | 5 e |
| Limb flux noise | 5 e/pixel/exposure |
| Integration time | 0.01 sec./exposure |
| Signal | 3,949 photons/exposure |
| Total noise | 63.27 e/exposure |
| SNR per exposure | 62.4 |
| Sighting time | 1 sec. |
| Number of exposures | 100/sec. |
| SNR of sighting | 624 |
| Number of pixels (diagonal) | 10,472 |
| Number of pixels (total, all sensors) | 52 million (16:9 aspect ratio) |
| Pixel size | 8.50 µm |
| Region of interest | 300 pixels |
| Region of interest field of view | 3.44° |
| Data rate | 9 Mpixels/sec. |
| Sensor field of view | 120° |
| Pixel instantaneous field of view | 2.00E−04 rad./pixel |
| Pixel subtense (DAS) | 41.25 arcseconds/pixel |
| Wavelength | 1.00E−04 cm (1,000 nm) |
| Sighting accuracy | 0.999 arcsecond |

In some cases, such as where the star tracker is attached to an artificial satellite or other space vehicle, optics and electronics of the star tracker may require thermal stabilization to ensure dimensional stability necessary to meet the 0.1 arcsecond accuracy specification. Space-based embodiments should include a thermal design that passes dissipated heat through the camera to the vehicle in a consistent flow. Airborne and ground-based system, such as jeep-mounted or soldier-mounted navigation systems, may require forced airflow to avoid undesirable thermal gradients.

Atmospheric turbulence can have a significant effect on airborne and ground-based sightings. Accurate weather updates may be used to by the controller to compensate for these effects. Optionally or alternatively, averaging multiple sightings taken in a relatively short period of time may compensate for atmospheric turbulence. A frame rate of about 100 images/sec. facilitates taking a sufficient number of sightings in a sufficiently short period of time.

Sighting during daytime presents additional atmospheric issues. Atmospheric scattering of light causes a high background level of illumination, through which a star or satellite sighting must be taken. However, some stars and artificial satellites are bright enough to be imaged against this background sky brightness.

The system may be initialized by executing a rapid, low accuracy scan to perform a lost-in-space attitude determination. This can be accomplished by sweeping the baffle through a large angle, thereby capturing a large field of view of the sky, containing sufficient navigational fiduciary markers to support the lost-in-space algorithm. A series of images may be captured as the baffle is swept. Alternatively, one (relatively long) image may be captured while the baffle is swept. Orientation information obtained from the initial scan needs to be only accurate enough so the baffle can be then be directed toward a star on the horizon, so a (more accurate) SHAR-based analysis can be performed. Optionally, the star tracker includes a coarse sun sensor, so the star tracker can avoid imaging the sun, thereby speeding the initial scan. Optionally, if another navigational system, such as an inertial navigation system (INS) or GPS, is available, it can be used to obtain the initial attitude.

Other Applications

A star tracker, as describe herein, may be used in submarine and unmanned undersea systems. In one embodiment, a star tracker is mounted atop a mast extending from a submerged vehicle to above the water's surface. The controller uses one or more images taken by the camera to ascertain a direction of the sun, moon or other bright object and to direct the aperture toward a portion of the sky not in the direction of the bright object and then capture one or more images of navigation stars, artificial satellites, land-based light beacons or other fiduciary markers. After analyzing the first one or more such images, the controller calculates an approximate location and orientation of the star tracker and directs the aperture toward one or more other expected navigational fiduciary markers and captures one or more additional images. The angular rate sensors are used to measure ship motion, so the controller can account for this motion in its position calculations. It should be noted that no radar or other radio frequency transmission is involved, thereby frustrating detection by an adversary. Using a wide field of view, such as by making many, most or all of the electro-optic pixels of the dome transparent, or by sweeping the mechanical baffle across large portions of the sky, the star tracker can capture an image of much of the sky, such as at night, and calculate a location using many navigational fiduciary markers.

A star tracker, as described herein, may be used in parallel with another navigation system, such as a GPS, as a backup, in case an on-board GPS receiver fails or the GPS is compromised. The star tracker may be used to verify a GPS-determined position and take over if the verification fails.

While the invention is described through the above-described exemplary embodiments, modifications to, and variations of, the illustrated embodiments may be made without departing from the inventive concepts disclosed herein. Furthermore, disclosed aspects, or portions of these aspects, may be combined in ways not listed above and/or not explicitly claimed. Accordingly, the invention should not be viewed as being limited to the disclosed embodiments.

Although aspects of embodiments may have been described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof.

Some embodiments have been described as including a processor-driven controller. These and other embodiments may be implemented by a processor executing, or controlled by, instructions stored in a memory to perform functions described herein. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks.

What is claimed is:

1. A star tracker, comprising:
    a camera having a field of view; and
    an electronically adjustable baffle assembly disposed relative to the camera and configured to expose a selectable portion, less than all, of the camera field of view to a scene, wherein direction of the selectable portion of the field of view, relative to the star tracker, is electronically selectable in both azimuth and elevation, and wherein the baffle assembly comprises at least a portion of a dome, the dome defining an aperture configured to expose the selectable portion of the camera field of view to the scene, the baffle assembly being rotatable about an optical axis of the camera.

2. A star tracker according to claim 1, wherein the selectable portion of the camera field of view is circular.

3. A star tracker according to claim 1, wherein the camera field of view is greater than 10°.

4. A star tracker according to claim 1, wherein the selectable portion of the camera field of view comprises less than 30% of the camera field of view.

5. A star tracker according to claim 1, wherein the dome defines an aperture configured to define the selectable portion of the camera field of view exposed to the scene.

6. A star tracker according to claim 1, wherein the aperture is positionable along an arc that intersects, and is coplanar with, the optical axis of the camera.

7. A star tracker according to claim 1, wherein the aperture is positionable within the camera field of view.

8. A star tracker according to claim 6, wherein the baffle assembly comprises a baffle having an axis that coincides with an optical axis of the selectable portion of the camera field of view.

9. A star tracker according to claim 1, wherein the selectable portion of the field of view of the camera comprises at least two discontiguous regions of the field of view of the camera.

10. A star tracker according to claim 1, wherein size of the selectable portion of the field of view of the camera is electronically adjustable.

11. A star tracker according to claim 1, wherein the camera comprises a monocentric objective lens.

12. A star tracker according to claim 11, wherein the camera comprises a plurality of pixelated image sensor arrays and a plurality of optical fibers optically coupling each pixelated image sensor array of the plurality of pixelated image sensor arrays to the monocentric objective lens.

13. A star tracker according to claim 1, further comprising:
a first rate sensor having a first sensory axis and being mechanically coupled to the camera;
a second rate sensor having a second sensory axis perpendicular to the first sensory axis and being mechanically coupled to the camera; and
a controller coupled to the camera, the baffle, the first rate sensor and the second rate sensor and configured to:
measure vibration of the camera, based on input signals from the first rate sensor and the second rate sensor; and
process an image captured by the camera, based on the vibration.

14. A star tracker according to claim 1, further comprising a controller coupled to the camera and the baffle assembly and configured to:
cause the camera to capture a first image; then
adjust the baffle assembly, such that a different portion of the camera field of view is exposed to the scene; and then
cause the camera to capture a second image.

15. A star tracker according to claim 14, wherein the controller is configured to determine a location of the camera, based at least in part on an analysis of at least a portion of the first image and at least a portion of the second image.

16. A star tracker according to claim 1, further comprising a controller coupled to the camera and the baffle assembly and configured to:
adjust the baffle assembly, such that the selectable portion of the camera field of view includes a portion of the scene expected to include a space object having a predictable location;
cause the camera to capture an image; and
determine a location of the camera, based at least in part on information about the space object and an analysis of at least a portion of the image.

17. A star tracker according to claim 16, wherein the space object comprises an astronomical object.

18. A star tracker according to claim 16, wherein the space object comprises an artificial satellite.

19. A star tracker according to claim 16, wherein the controller is configured to determine the location of the camera based at least in part on dispersion of light from the space object through earth's atmospheric limb.

20. A star tracker according to claim 16, wherein the controller is configured to determine the location of the camera based at least in part on refraction of light from the space object through earth's atmospheric limb.

21. A star tracker according to claim 1, further comprising a controller coupled to the camera and the baffle assembly and configured to:
cause the camera to capture an image; and
analyze a portion, less than all, of the image, the portion of the image corresponding to the portion of the camera field of view exposed to the scene.

22. A star tracker according to claim 1, wherein:
the camera comprises a plurality of image sensor arrays, each image sensor array of the plurality of image sensor arrays comprising a plurality of pixels; and further comprising:
a controller coupled to the camera and the baffle assembly and configured to read a subset, less than all, of the pixels of the plurality of image sensor arrays, the subset corresponding to the selectable portion of the camera field of view exposed to the scene.

23. A method for exposing a selectable portion, less than all, of a field of view of a camera in a star tracker to a scene, the method comprising:
disposing a baffle assembly adjacent the camera, such that the camera is aimed toward an interior of the baffle assembly, the baffle assembly being configured to define an aperture whose position on the baffle assembly is electronically adjustable, in both azimuth and elevation, and such that the aperture defines the selectable portion, less than all, of the field of view of the camera exposed to the scene, and wherein the baffle assembly comprises at least a portion of a dome, the dome defining an aperture configured to expose the selectable portion of the camera field of view to the scene, the baffle assembly being rotatable about an optical axis of the camera; and
under control of a processor, adjusting the position of the aperture on the baffle assembly, such that the aperture is oriented toward the scene.

24. A method according to claim 23, wherein:
the baffle assembly comprises a dome that defines an elongated opening extending along a longitude of the dome; the method further comprising:
disposing a curtain within the opening, the curtain being movable along the longitude of the dome, the curtain obscuring the opening from the camera field of view, except the curtain defining the aperture;
wherein adjusting the position of the aperture comprises:
under control of a processor, rotating the dome about an axis of symmetry of the dome, such that the opening in the dome is oriented toward the scene; and
under control of a processor, moving the curtain along the longitude of the dome, such that the aperture is oriented toward the scene.

25. A method according to claim 23, further comprising:
under control of a processor, measuring vibration of the camera, based on input signals from a first rate sensor and a second rate sensor; and
processing an image captured by the camera, based on the vibration.

26. A method according to claim 23, further comprising:
after adjusting the position of the aperture, under control of a processor, capturing a first image by the camera; then
adjusting the position of the aperture on the baffle assembly, such that a different portion of the camera field of view is exposed to the scene; and then under control of the processor, capturing a second image by the camera.

27. A method according to claim 26, further comprising determining a location of the camera, based at least in part on an analysis of at least a portion of the first image and at least a portion of the second image.

28. A method according to claim 23, wherein:
adjusting the position of the aperture comprises automatically adjusting the position of the aperture such that the selectable portion of the camera field of view includes a portion of the scene expected to include a space object having a predictable location;
causing the camera to capture an image; and
automatically determining a location of the camera, based at least in part on information about the space object and an analysis of at least a portion of the image.

29. A method according to claim 28, wherein the space object comprises an astronomical object.

30. A method according to claim 28, wherein the space object comprises an artificial satellite.

31. A method according to claim 28, wherein determining the location of the camera comprises determining the location of the camera based at least in part on dispersion of light from the space object through earth's atmospheric limb.

32. A method according to claim 28, wherein determining the location of the camera comprises determining the location of the camera based at least in part on refraction of light from the space object through earth's atmospheric limb.

33. A method according to claim 23, further comprising:
automatically causing the camera to capture an image; and
automatically analyzing a portion, less than all, of the image, the portion of the image corresponding to the portion of the camera field of view exposed to the scene.

34. A method according to claim 23, wherein:
the camera comprises a plurality of image sensor arrays, each image sensor array of the plurality of image sensor arrays comprising a plurality of pixels; the method further comprising:
reading a subset, less than all, of the pixels of the plurality of image sensor arrays, the subset corresponding to the selectable portion of the camera field of view exposed to the scene.

35. A computer program product for exposing a selectable portion, less than all, of a field of view of a camera in a star tracker to a scene, wherein a baffle assembly is disposed adjacent the camera, such that the camera is aimed toward an interior of the baffle assembly, the baffle assembly being configured to define an aperture whose position on the baffle assembly is electronically adjustable, both in azimuth and elevation, and such that the aperture defines the selectable portion, less than all, of the field of view of the camera exposed to the scene, and wherein the baffle assembly comprises at least a portion of a dome, the dome defining an aperture configured to expose the selectable portion of the camera field of view to the scene, the baffle assembly being rotatable about an optical axis of the camera, the computer program product comprising a non-transitory computer-readable medium having computer readable program code stored thereon, the computer readable program code being configured to cause the processor to perform operations including:
adjusting the position of the aperture on the baffle assembly, such that the aperture is oriented toward the scene.

36. A computer program product according to claim 35, wherein the baffle assembly comprises a dome that defines an elongated opening extending along a longitude of the dome, a curtain is disposed within the opening, the curtain being movable along the longitude of the dome, the curtain obscuring the opening from the camera field of view, except the curtain defining the aperture and the computer readable program code is configured to adjust the position of the aperture by causing the processor to perform operations including:
rotating the dome about an axis of symmetry of the dome, such that the opening in the dome is oriented toward the scene; and
moving the curtain along the longitude of the dome, such that the aperture is oriented toward the scene.

37. A star tracker according to claim 2, wherein size of the selectable portion of the field of view of the camera is electronically adjustable.

38. A star tracker, comprising:
a camera having a field of view; and
an electronically adjustable baffle assembly disposed relative to the camera and configured to expose a selectable portion, less than all, of the camera field of view to a scene, wherein direction of the selectable portion of the field of view, relative to the star tracker, is electronically selectable in both azimuth and elevation, wherein the baffle assembly comprises a plurality of elements, wherein transparency of each element of the plurality of elements is electronically controllable, such that the selectable portion of the field of view of the camera is exposed to the scene through at least one transparent element of the plurality of elements and a remaining portion of the field of view of the camera is obscured from the scene by at least one non-transparent element of the plurality of the elements.

39. A star tracker according to claim 38, wherein the selectable portion of the camera field of view is circular.

40. A star tracker according to claim 38, wherein the camera field of view is greater than 10°.

41. A star tracker according to claim 38, wherein the selectable portion of the camera field of view comprises less than 30% of the camera field of view.

42. A star tracker according to claim 38, wherein the baffle defines an aperture configured to define the selectable portion of the camera field of view exposed to the scene.

43. A star tracker according to claim 38, wherein the aperture is positionable along an arc that intersects, and is coplanar with, the optical axis of the camera.

44. A star tracker according to claim 38, wherein the aperture is positionable within the camera field of view.

45. A star tracker according to claim 38, wherein the selectable portion of the field of view of the camera comprises at least two discontiguous regions of the field of view of the camera.

46. A star tracker according to claim 38, wherein size of the selectable portion of the field of view of the camera is electronically adjustable.

47. A star tracker according to claim 38, wherein the camera comprises a monocentric objective lens.

48. A star tracker according to claim 47, wherein the camera comprises a plurality of pixelated image sensor arrays and a plurality of optical fibers optically coupling each pixelated image sensor array of the plurality of pixelated image sensor arrays to the monocentric objective lens.

49. A star tracker according to claim 38, further comprising:
a first rate sensor having a first sensory axis and being mechanically coupled to the camera;

a second rate sensor having a second sensory axis perpendicular to the first sensory axis and being mechanically coupled to the camera; and a controller coupled to the camera, the baffle, the first rate sensor and the second rate sensor and configured to:
measure vibration of the camera, based on input signals from the first rate sensor and the second rate sensor; and
process an image captured by the camera, based on the vibration.

50. A star tracker according to claim 38, further comprising a controller coupled to the camera and the baffle assembly and configured to:
cause the camera to capture a first image; then
adjust the baffle assembly, such that a different portion of the camera field of view is exposed to the scene; and then
cause the camera to capture a second image.

51. A star tracker according to claim 50, wherein the controller is configured to determine a location of the camera, based at least in part on an analysis of at least a portion of the first image and at least a portion of the second image.

52. A star tracker according to claim 38, further comprising a controller coupled to the camera and the baffle assembly and configured to:
adjust the baffle assembly, such that the selectable portion of the camera field of view includes a portion of the scene expected to include a space object having a predictable location;
cause the camera to capture an image; and
determine a location of the camera, based at least in part on information about the space object and an analysis of at least a portion of the image.

53. A star tracker according to claim 52, wherein the space object comprises an astronomical object.

54. A star tracker according to claim 52, wherein the space object comprises an artificial satellite.

55. A star tracker according to claim 52, wherein the controller is configured to determine the location of the camera based at least in part on dispersion of light from the space object through earth's atmospheric limb.

56. A star tracker according to claim 52, wherein the controller is configured to determine the location of the camera based at least in part on refraction of light from the space object through earth's atmospheric limb.

57. A star tracker according to claim 38, further comprising a controller coupled to the camera and the baffle assembly and configured to:
cause the camera to capture an image; and
analyze a portion, less than all, of the image, the portion of the image corresponding to the portion of the camera field of view exposed to the scene.

58. A star tracker according to claim 38, wherein:
the camera comprises a plurality of image sensor arrays, each image sensor array of the plurality of image sensor arrays comprising a plurality of pixels; and further comprising:
a controller coupled to the camera and the baffle assembly and configured to read a subset, less than all, of the pixels of the plurality of image sensor arrays, the subset corresponding to the selectable portion of the camera field of view exposed to the scene.

59. A method for exposing a selectable portion, less than all, of a field of view of a camera in a star tracker to a scene, the method comprising:

disposing a baffle assembly adjacent the camera, such that the camera is aimed toward an interior of the baffle assembly, the baffle assembly being configured to define an aperture whose position on the baffle assembly is electronically adjustable, in both azimuth and elevation, and such that the aperture defines the selectable portion, less than all, of the field of view of the camera exposed to the scene, and the baffle assembly comprises a plurality of elements, wherein transparency of each element of the plurality of elements is electronically controllable; and under control of a processor, adjusting the position of the aperture on the baffle assembly, such that the aperture is oriented toward the scene, including, under control of a processor, setting transparency of at least one selected element of the plurality of elements, such that the selectable portion of the field of view of the camera is exposed to the scene through at least one transparent element of the plurality of elements and a remaining portion of the field of view of the camera is obscured from the scene by at least one non-transparent element of the plurality of the elements.

60. A method according to claim 59, wherein adjusting the position of the aperture on the baffle assembly comprises, under control of the processor, setting transparency of the at least one selected element of the plurality of elements to adjust size of the aperture.

61. A method according to claim 59, further comprising:
under control of a processor, measuring vibration of the camera, based on input signals from a first rate sensor and a second rate sensor; and
processing an image captured by the camera, based on the vibration.

62. A method according to claim 59, further comprising:
after adjusting the position of the aperture, under control of a processor, capturing a first image by the camera; then
adjusting the position of the aperture on the baffle assembly, such that a different portion of the camera field of view is exposed to the scene; and then
under control of the processor, capturing a second image by the camera.

63. A method according to claim 62, further comprising determining a location of the camera, based at least in part on an analysis of at least a portion of the first image and at least a portion of the second image.

64. A method according to claim 59, wherein:
adjusting the position of the aperture comprises automatically adjusting the position of the aperture such that the selectable portion of the camera field of view includes a portion of the scene expected to include a space object having a predictable location;
causing the camera to capture an image; and
automatically determining a location of the camera, based at least in part on information about the space object and an analysis of at least a portion of the image.

65. A method according to claim 64, wherein the space object comprises an astronomical object.

66. A method according to claim 64, wherein the space object comprises an artificial satellite.

67. A method according to claim 64, wherein determining the location of the camera comprises determining the location of the camera based at least in part on dispersion of light from the space object through earth's atmospheric limb.

68. A method according to claim 64, wherein determining the location of the camera comprises determining the location of the camera based at least in part on refraction of light from the space object through earth's atmospheric limb.

69. A method according to claim 59, further comprising:
automatically causing the camera to capture an image; and
automatically analyzing a portion, less than all, of the image, the portion of the image corresponding to the portion of the camera field of view exposed to the scene.

70. A method according to claim 59, wherein:
the camera comprises a plurality of image sensor arrays, each image sensor array of the plurality of image sensor arrays comprising a plurality of pixels; the method further comprising:
reading a subset, less than all, of the pixels of the plurality of image sensor arrays, the subset corresponding to the selectable portion of the camera field of view exposed to the scene.

71. A computer program product for exposing a selectable portion, less than all, of a field of view of a camera in a star tracker to a scene, wherein a baffle assembly is disposed adjacent the camera, such that the camera is aimed toward an interior of the baffle assembly, the baffle assembly being configured to define an aperture whose position on the baffle assembly is electronically adjustable, both in azimuth and elevation, and such that the aperture defines the selectable portion, less than all, of the field of view of the camera exposed to the scene, and wherein the baffle assembly comprises a plurality of elements, wherein transparency of each element of the plurality of elements is electronically controllable, the computer program product comprising a non-transitory computer-readable medium having computer readable program code stored thereon, the computer readable program code being configured to cause the processor to perform operations including:
adjusting the position of the aperture on the baffle assembly, such that the aperture is oriented toward the scene, by setting transparency of at least one selected element of the plurality of elements, such that the selectable portion of the field of view of the camera is exposed to the scene through at least one transparent element of the plurality of elements and a remaining portion of the field of view of the camera is obscured.

\* \* \* \* \*